C. F. SMITH.
TAG MACHINE.
APPLICATION FILED OCT. 20, 1909.

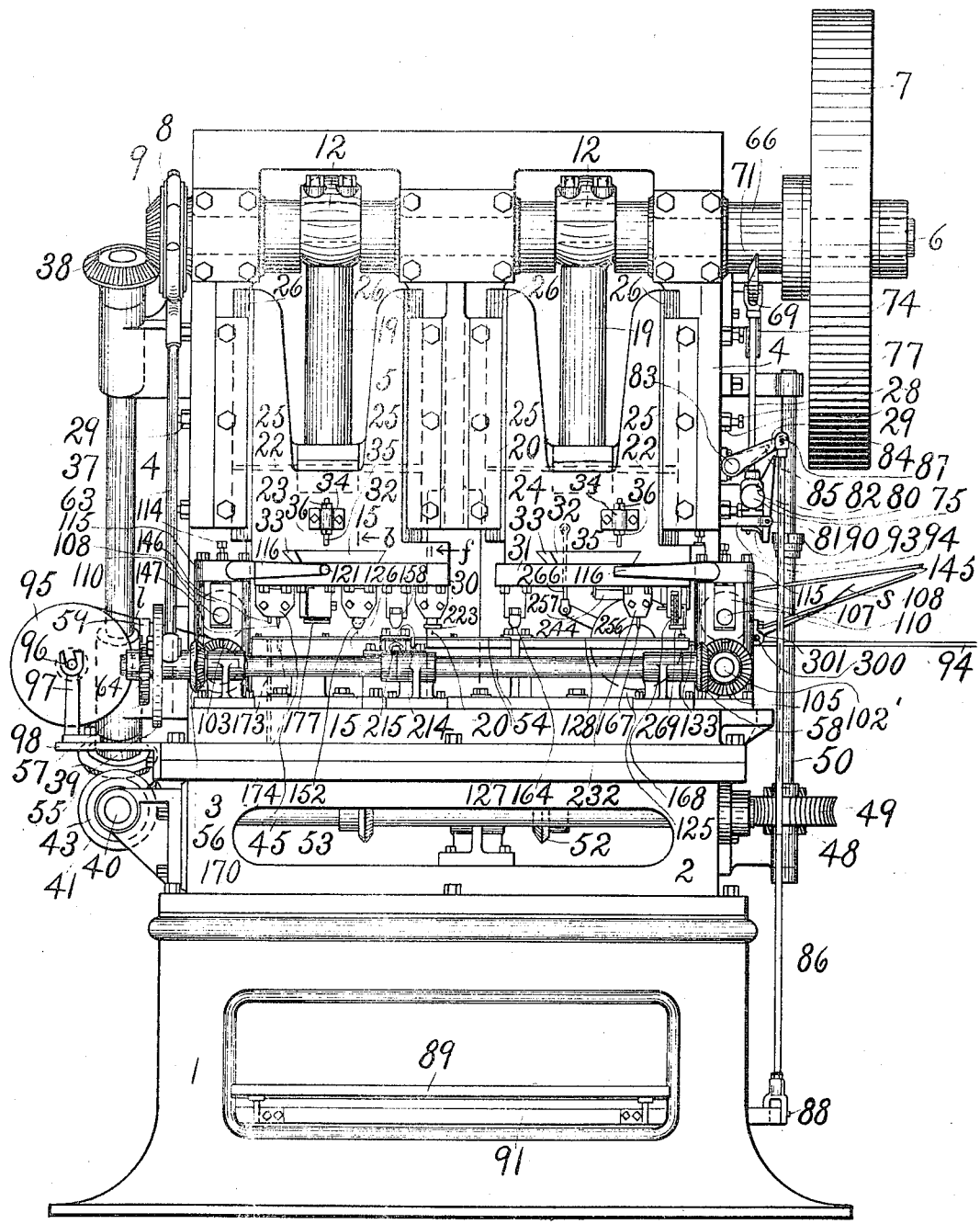

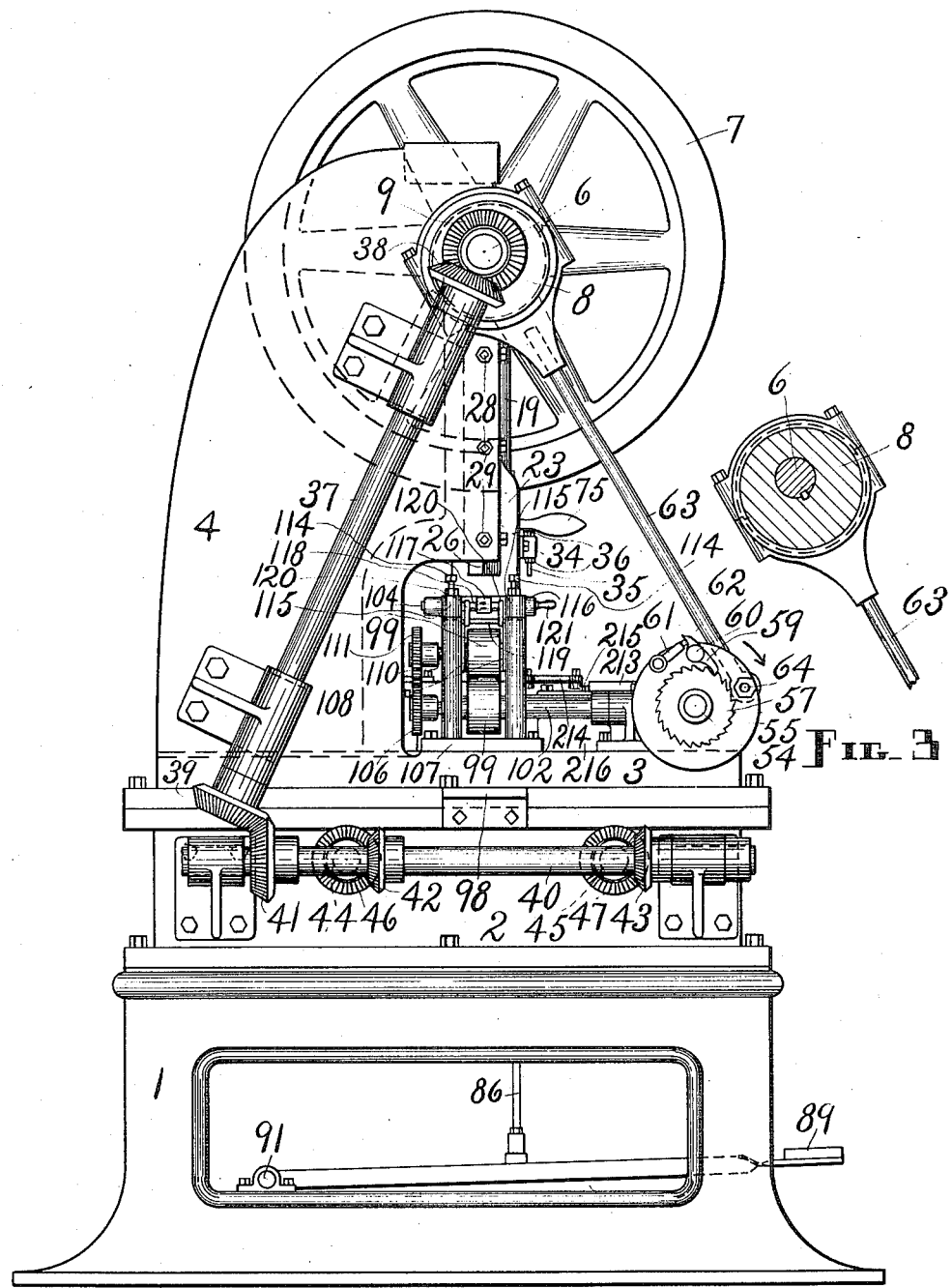

986,232.

Patented Mar. 7, 1911.
8 SHEETS—SHEET 3.

WITNESSES:
A. C. Fairbanks.
J. M. Davenport.

INVENTOR.
Charles F. Smith,
BY Webster & Co.,
ATTORNEYS.

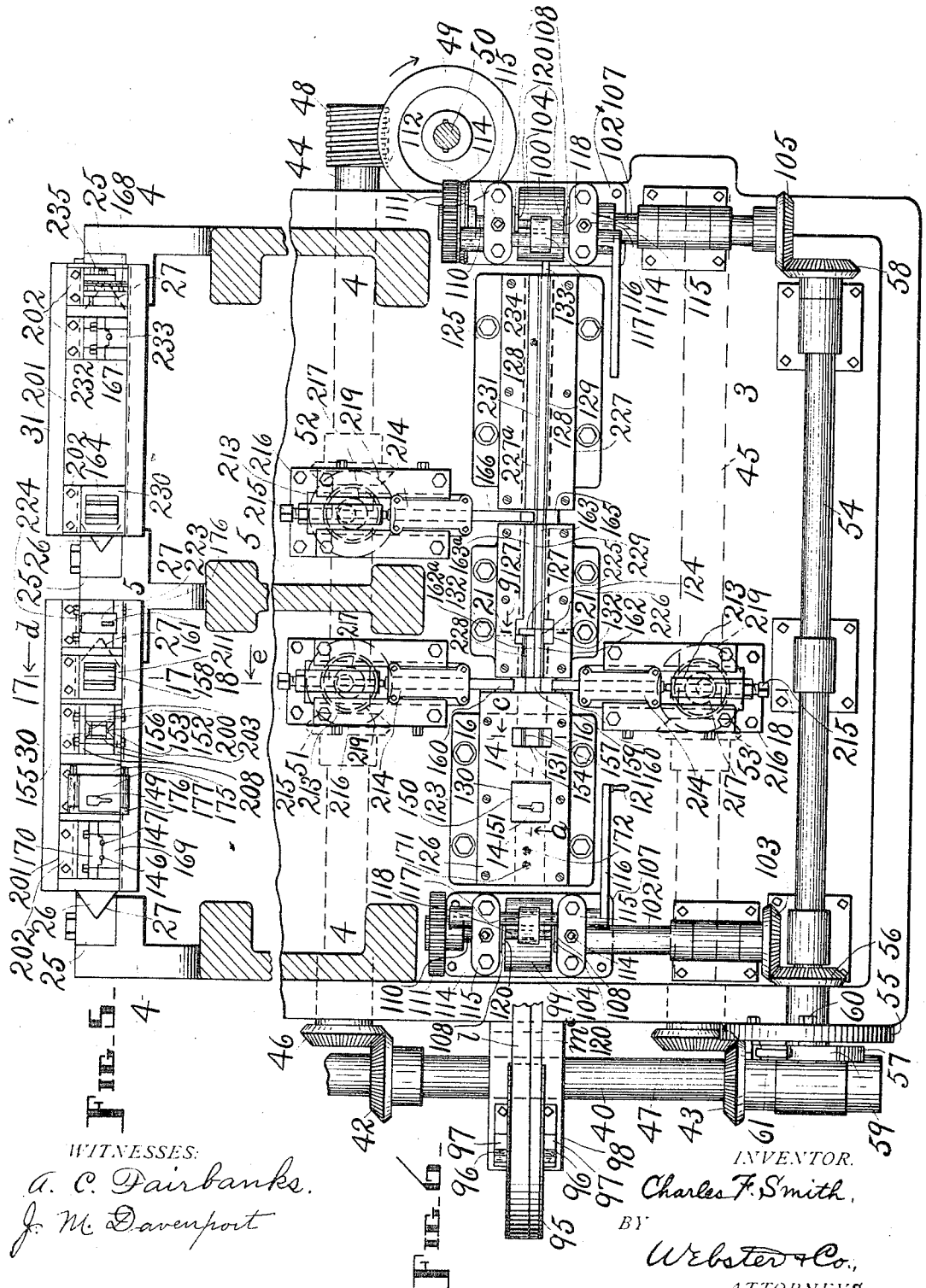

C. F. SMITH.
TAG MACHINE.
APPLICATION FILED OCT. 20, 1909.
986,232.
Patented Mar. 7, 1911.
8 SHEETS—SHEET 5.
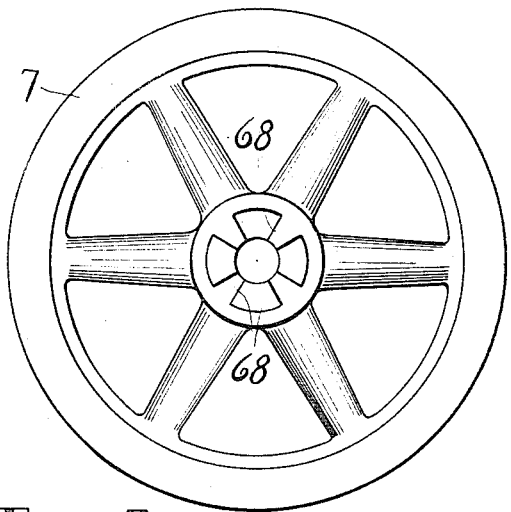
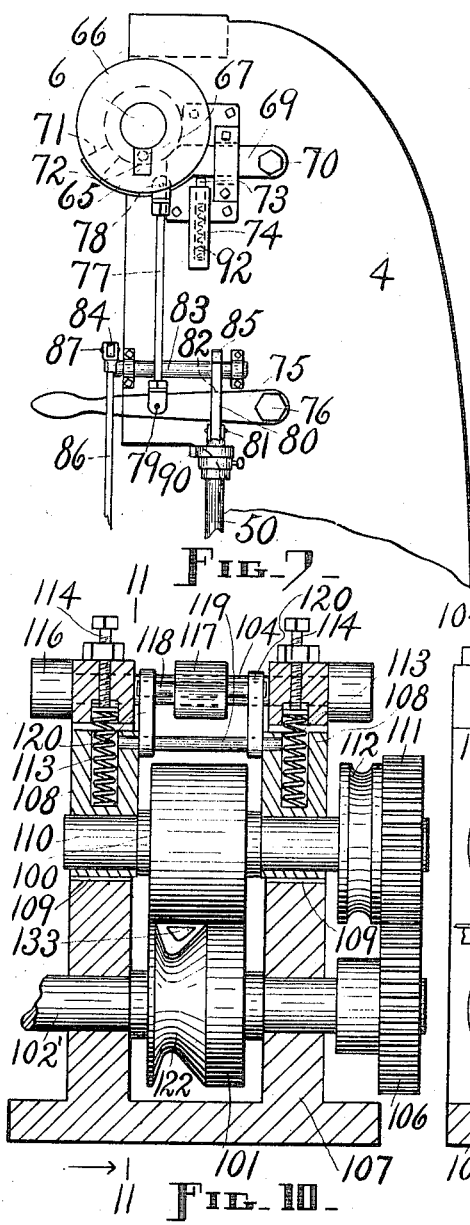
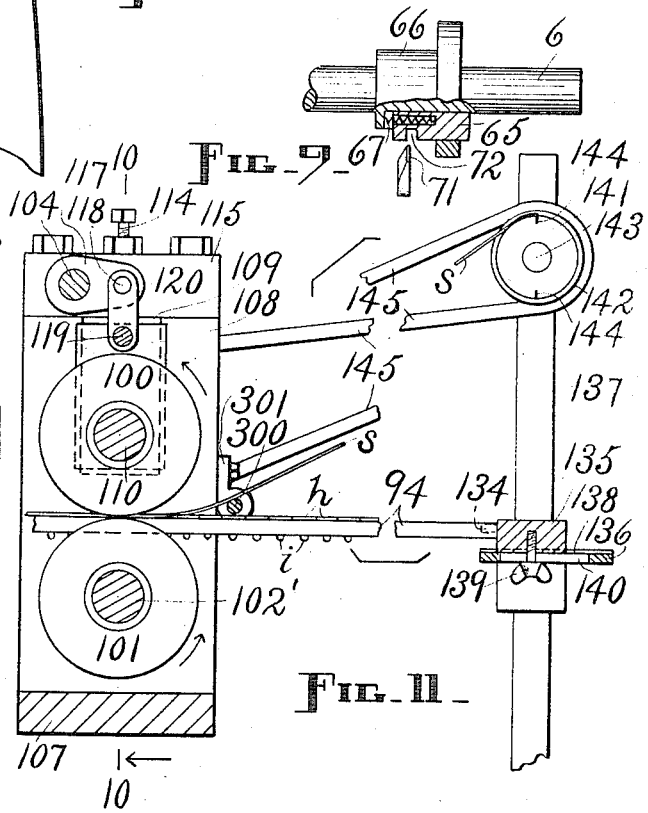
WITNESSES:
A. C. Fairbanks.
J. M. Davenport
INVENTOR.
Charles F. Smith,
BY Webster & Co.,
ATTORNEYS.

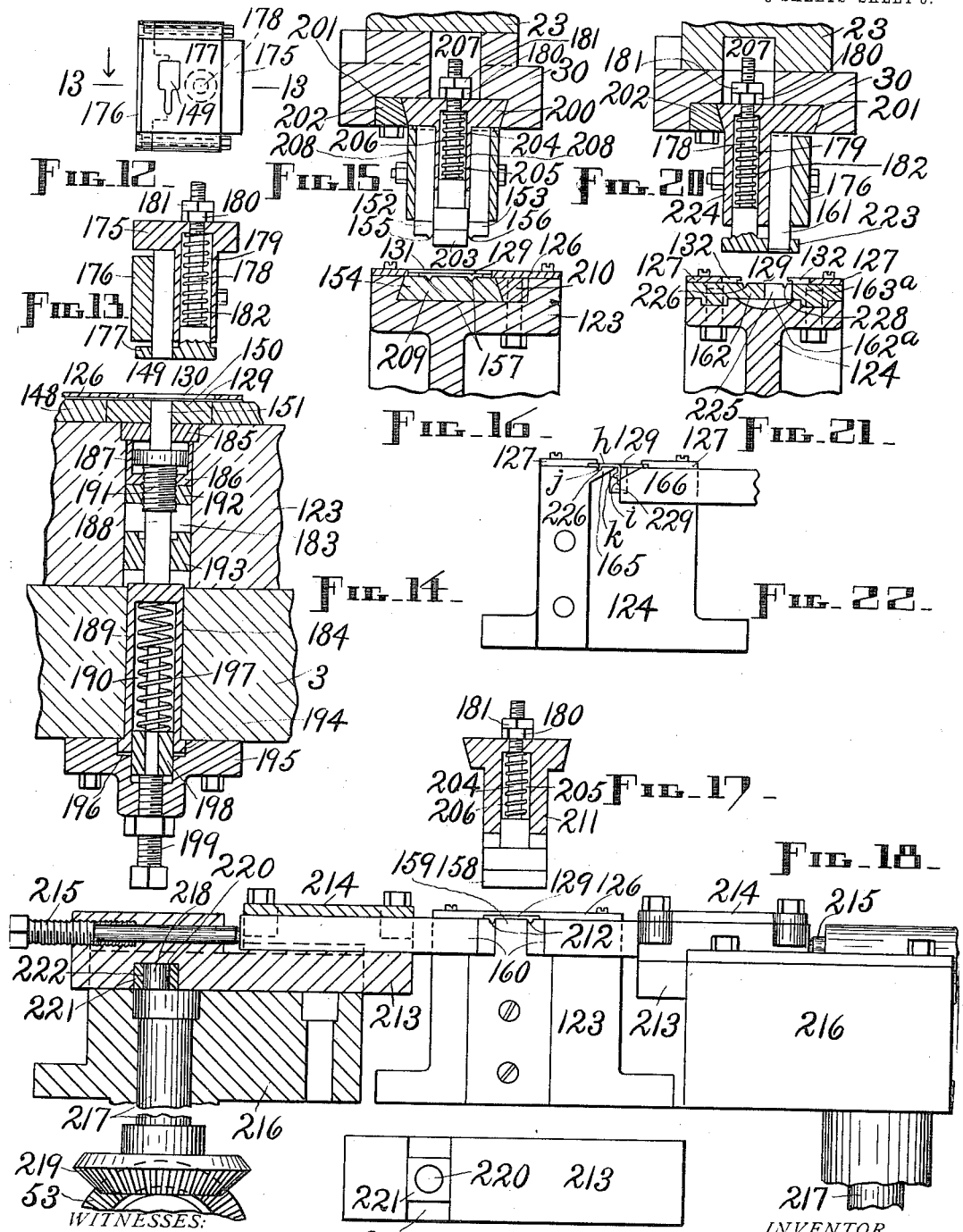

C. F. SMITH.
TAG MACHINE.
APPLICATION FILED OCT. 20, 1909.

986,232.

Patented Mar. 7, 1911.
8 SHEETS—SHEET 7.

WITNESSES:
A. C. Fairbanks.
J. M. Davenport

INVENTOR.
Charles F. Smith,
BY
Webster & Co.,
ATTORNEYS.

C. F. SMITH.
TAG MACHINE.
APPLICATION FILED OCT. 20, 1909.
986,232.
Patented Mar. 7, 1911.
8 SHEETS—SHEET 8.
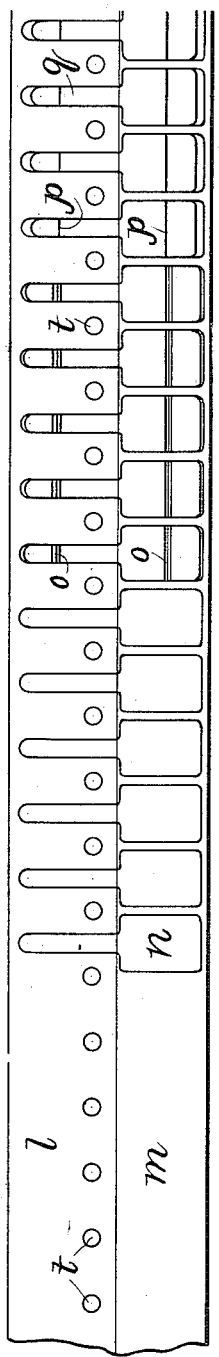
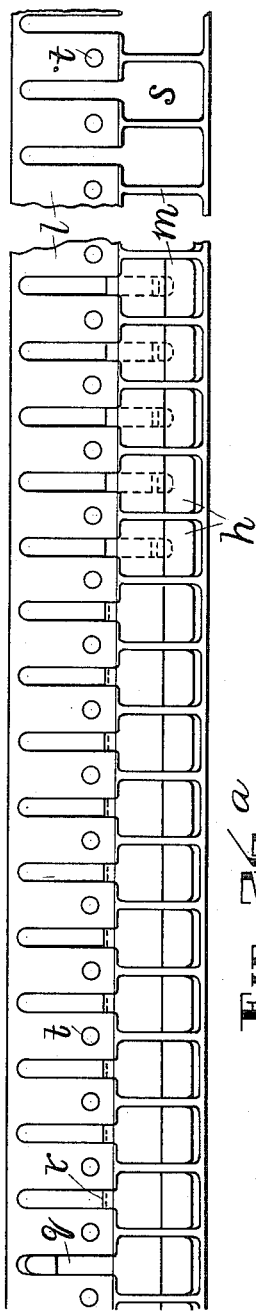
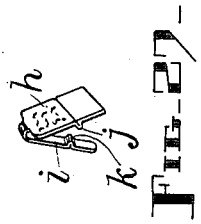
WITNESSES:
A. C. Fairbanks.
J. M. Davenport
INVENTOR.
Charles F. Smith,
BY
Webster & Co.,
ATTORNEYS.

UNITED STATES PATENT OFFICE.

CHARLES F. SMITH, OF BRIDGEPORT, CONNECTICUT, ASSIGNOR TO McCALLUM HOSIERY COMPANY, OF NORTHAMPTON, MASSACHUSETTS, A CORPORATION OF MASSACHUSETTS.

TAG-MACHINE.

986,232.      Specification of Letters Patent.      Patented Mar. 7, 1911.

Application filed October 20, 1909. Serial No. 523,667.

*To all whom it may concern:*

Be it known that I, CHARLES F. SMITH, a citizen of the United States of America, residing at Bridgeport, in the county of Fairfield and State of Connecticut, have invented a new and useful Tag-Machine, of which the following is a specification.

My invention relates to improvements in machines for punching tag-blanks from strips of sheet-metal and forming such blanks into tags of a particular kind and more especially such as those covered by United States Letters Patent No. 843,960, issued February 12th, 1907, and said invention resides generally in certain peculiar feeding, punching or stamping, forming, and printing mechanisms, and in the parts and combinations of parts which go to make up the complete machine, including manually-operated starting and automatically- and pedally-operated stopping mechanism, actuating mechanism, etc., all as hereinafter set forth.

The primary object of my invention is to produce a practicable and efficient machine for the manufacture expeditiously, accurately and economically of tags and the like and particularly metallic tags such as those referred to above; nevertheless, the machine might be adapted without serious difficulty for other work or for manufacturing different kinds of tags by changing the forms or shapes of the punch and die members, more or less, and otherwise making alterations, all readily occurring to one skilled in the art and well within the purview of my invention.

Other objects will present themselves in the course of the following description.

I attain the objects and secure the advantages of my invention by the mechanism illustrated in the accompanying drawings, in which—

Figure 4:
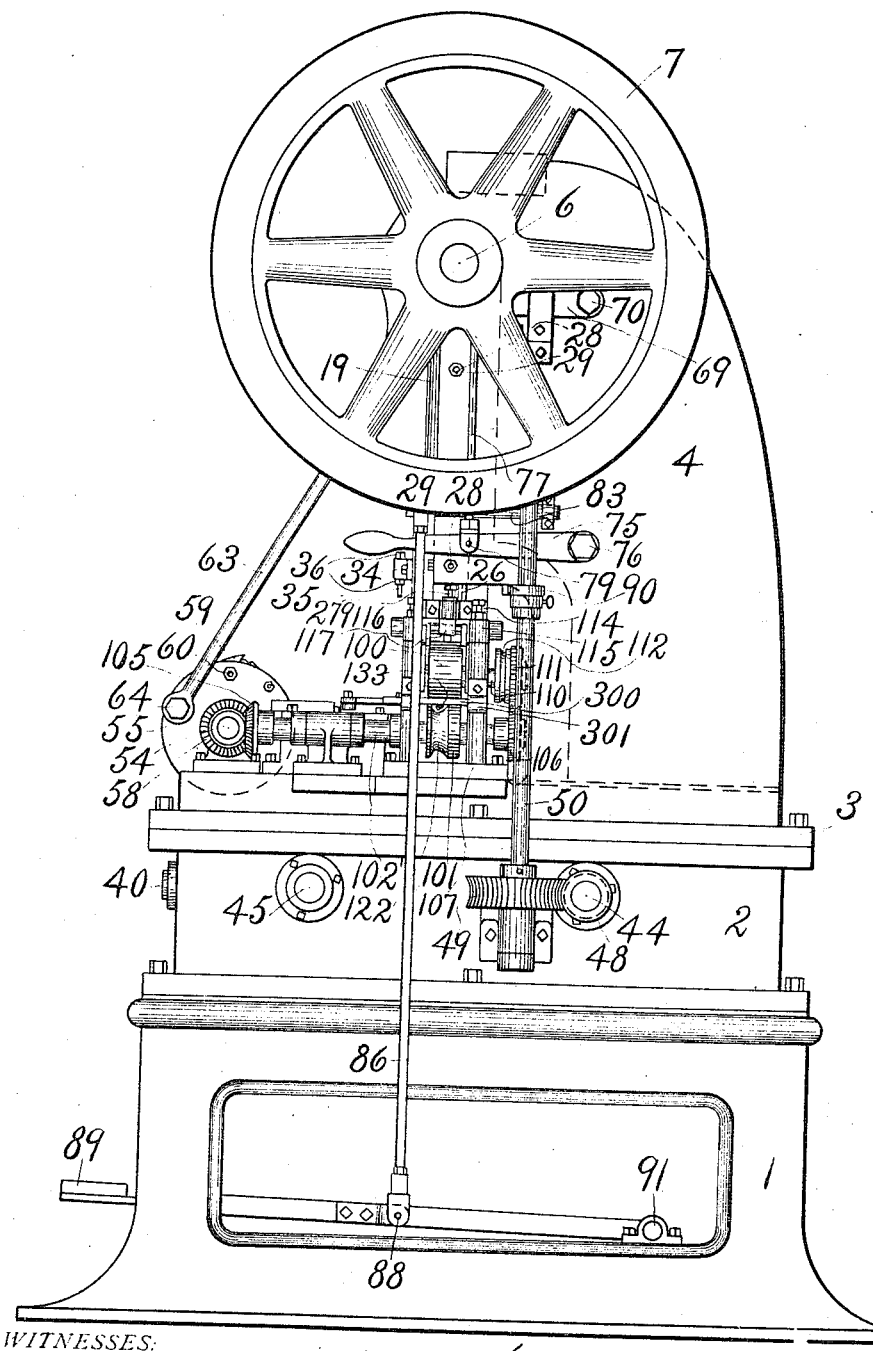
Figures 23, 24:
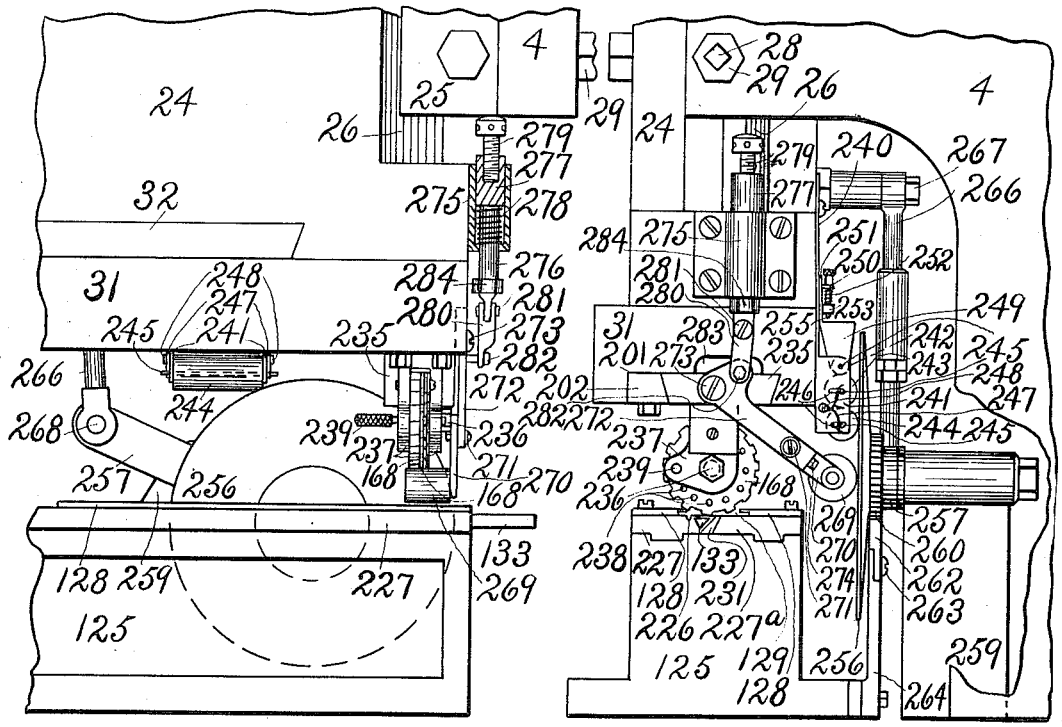
Figure 25:
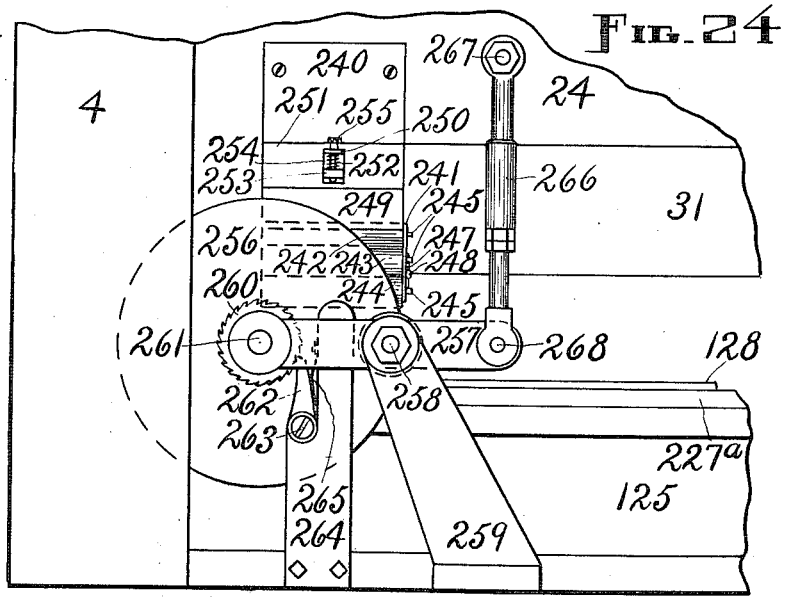

Figure 1 is a front elevation of a machine which embodies my invention in a practical form; Fig. 2, a left-hand end elevation of such machine; Fig. 3, a detail of a part of the actuating mechanism for the feel-rollers; Fig. 4, a right-hand end elevation of said machine; Fig. 5, an enlarged bottom plan of the stamp members, their holders and associated parts; Fig. 6, an enlarged top plan of the die members, their holders, the rib-closers, the tongue-benders, and associated parts, and of some of the feeding and actuating mechanism; Fig. 7, a detail of the starting and stopping mechanism of the machine; Fig. 8, an elevation of the driving-pulley from the inside; Fig. 9, a detail in partial section of the locking and releasing members of said starting and stopping mechanism; Fig. 10, a detail, on a still larger scale than Figs. 5 and 6, of the feed-rollers and connected or connecting members, the supporting and bearing parts for such rollers being in section taken on lines 10—10, looking in the direction of the associated arrow, in Fig. 11; Fig. 11, a view taken on lines 11—11, looking in the direction of the associated arrow, in Fig. 10, and including in addition the supplementary supporting means for the tag-receiving tube and the winding device for the skeleton or waste portion of the strip; Fig. 12, a bottom view of the blank-cutting punch, clamp and holder, this and the next thirteen views being on the same scale as Figs. 10 and 11; Fig. 13, a vertical section on lines 13—13, looking in the direction of the associated arrow, in Fig. 12; Fig. 14, a vertical section through the blanking die, the blank-replacing device, and the holder, taken on lines 14—14, looking in the direction of the arrow *a*, in Fig. 6; Fig. 15, a vertical section on lines 15—15, looking in the direction of the arrow *b*, in Fig. 1, showing the rib-forming stamp, associated clamp, and the holder therefor in detail; Fig. 16, a vertical section on lines 16—16, looking in the direction of the arrow *c*, in Fig. 6, showing the rib-forming die and its holder; Fig. 17, a detail of the clamp which coacts with the rib-closers, the view being taken on lines 17—17, looking in the direction of the arrow *d*, in Fig. 5; Fig. 18, a detail in partial section of the rib-closers or of the rib-closing mechanism, the same being as though taken approximately on lines 18—18, looking in the direction of the arrow *e*, in Fig. 6; Fig. 19, a bottom view of one of the rib-closing slides; Fig. 20, a detail of the tongue-bending punch or stamp, clamp and holder, said detail being a partial section on lines 20—20, looking in the direction of the arrow *f*, in Fig. 1; Fig. 21, a sectional detail, on lines 21—21, looking in the direction of the arrow *g*, in Fig. 6, of the tongue-bending die members or plates and supporting parts; Fig. 22, a detail of the tongue-bender; Fig. 23, a front elevation and partial section of the printing apparatus, showing it out of printing position; Fig. 24, an elevation of said apparatus as viewed from the right-hand end of the machine, showing it in printing position; Fig. 25, a rear elevation of said apparatus, the parts standing as in the preceding view; Figs. 26 and 26ª combined, a large top plan of a portion of a strip handled by this machine in the production of tags and from which said tags are made, the portion herein appearing serving to illustrate the several steps in the process of manufacturing the tags, and, Fig. 27, a large perspective view of a complete tag.

Similar characters refer to similar parts throughout the several views.

The tag which this machine turns out consists of a face-piece $h$ and a tongue $i$, with inwardly-extending ribs $j$ and $k$ on the interior of said face-piece and tongue, respectively, intermediate of their ends, as best shown in the last view. The ribs $j$ and $k$ are offset from each other so that they shut by when the tag is closed in attaching it to a textile or fabric article or articles to which it is applicable and for which it is designed, such as hosiery for example, that is to say, the inner edges of such ribs pass each other so as to enable the ribs to obtain a firm hold on such article or articles.

The tags are made from a strip $l$ of thin sheet-metal, and, since said tags are employed to indicate the style, size, quality, price, etc., of the articles to which they are to be attached, it is desirable not to say necessary that their face-pieces $h$ have a printing surface or a surface which can be printed upon readily, wherefore said metallic strip has a paper strip $m$ imposed thereon and permanently affixed thereto, such paper strip being on the outer or upper surface of the metallic strip and covering enough of such surface in width to provide each tag or the face-piece of each tag with an outer integument of paper. Sheet-aluminum is one of the best materials for the strip $l$. The prepared or papered strip $l$ is seen to best advantage in Figs. 26 and 26ª.

The strip $l$ is fed through the machine and during its passage thereto tag-blanks $n$, Fig. 26, are punched from said strip and replaced in the openings from which they are punched, rudimentary ribs $o$ are struck down from such blanks, such rudimentary ribs are closed, as at $p$ in Figs. 26 and 26ª, to form the ribs $j$ and $k$, the tail-pieces $q$ of the blanks are bent down, as at $r$ in Fig. 26ª, and then bent forward and left standing at an incline to form the tongues $i$, and the face-pieces $h$ of the finished tags are printed upon. The tags are finally separated from the strip $l$ and leave it a mere skeleton as represented at the left of the break in Fig. 26ª. These operations will all be described fully in detail in the course of the following description. The process through which the tags pass from start to finish during the course of their manufacture does not dislodge the paper strip $m$ from the metallic strip $l$, hence a portion of such strip $m$ must remain on each face-piece $h$.

Passing now to the machine itself, as illustrated, it will first be observed that the frame of such machine consists of a base 1, a bed 2 mounted on such base, and a table 3 mounted on such bed, such table having uprights or side pieces 4—4 and an upright or center piece 5 which rise from the ends and middle of the table behind the longitudinal center of the same and are connected at the top so as to form a strong and stable support for the parts carried thereby. The aforesaid base, bed and table are rectangular in plan, and they are securely bolted together. Furthermore, they with their superstructure are heavy enough to afford the stability and rigidity necessary in a machine of this kind. Suitably journaled in bearings near the upper ends of the uprights 4 and 5 at the front is a horizontal, main-driving shaft 6 having a driving pulley 7 loose on its right-hand terminal. Tight on the end of the shaft 6 opposite that which carries the pulley 7 and outside of the frame are an eccentric 8 and a bevel-gear 9, the latter at the left of the former. The shaft 6 is cranked, as indicated at 12—12, in Fig. 1, between the end uprights 4 and the center upright 5, and connecting-rods 19—19 are mounted at their upper terminals on the cranks thus formed. The bases of the connecting-rods 19 are pivotally connected, as indicated at 22—22 in Fig. 1, with two stamp-plungers 23 and 24 mounted to reciprocate vertically in two pairs of way-blocks 25 which are securely bolted to the supports 4 and 5 in such a manner that their front faces are flush with the front edges of said uprights. The lateral edges 26—26 of each plunger are V-shaped, and there are corresponding V-shaped grooves 27 in the contiguous edges of each pair of way-blocks 25 to receive said edges 26, all of usual construction and as clearly shown in Figs. 1, 5, 23 and 24. Bolts 28 tapped into the side pieces 4, and set-nuts 29, may be employed to take up wear between the plungers and the way-blocks, in the usual manner. The plungers 23 and 24 are respectively provided on their bottoms with punch- and stamp-holding blocks 30 and 31, such blocks being dovetailed into said plungers at 32—32 and wedged therein at 33—33. On the front of each plunger is a bracket 34 into which is fitted a pin or dog 35, such dog standing vertically and being rendered adjustable by means of suitable nuts 36. The axes of the pins of the cranks 12 are in line with each other and the connecting-rods 19 are both of the same length, hence identically the same motion is imparted to the plunger 23 that is imparted to the other plunger, and vice versa. This being true, it will be seen that one plunger might be substituted for the two, so far as the merits of this invention are concerned, and in any event the machine can be shortened considerably as plainly appears or will so appear before the end of this description is reached.

Suitably journaled in bearings on the outer face of the left-hand side piece 4 is a shaft 37 which carries at its upper end a bevel-gear 38, in mesh with the bevel-gear 9, and at its lower end a bevel-gear 39. The shaft 37 has a backward inclination from the top. Suitably journaled in bearings on the left-hand end of the bed 2 is a horizontal shaft 40 which carries three bevel-gears 41, 42 and 43, the first of these gears being in mesh with the bevel-gear 39. Suitably journaled in the bed 2, at right-angles to the shaft 40, are two horizontal, parallel shafts 44 and 45 which respectively carry on their left-hand ends bevel-gears 46 and 47, the former meshing with the bevel-gear 42 and the latter with the bevel-gear 43. There is a worm 48 on the right-hand end of the shaft 44, which worm drives a worm-wheel 49 carried at the lower terminal of a vertical shaft 50, the latter being suitably journaled in bearings on the upper face of the right-hand side piece 4. There are two intermediate bevel-gears 51 and 52 on the back shaft 44, and there is an intermediate bevel-gear 53 on the front shaft 45. Mounted in suitable bearings on the table 3, near the front edge thereof, is a shaft 54 which carries a ratchet-wheel 57 and a bevel-gear 56 on its left-hand terminal, with a disk 55 between, and a bevel-gear 58 on its right-hand end. A pawl 59, for a ratchet-wheel 57, is pivoted at 60 to the outer face of the disk 55, and a socket 61, which carries a spring-pressed pin 62 to actuate said pawl into contact with the ratchet-wheel teeth, is also attached to the outer face of said disk. A connecting-rod 63, inclined from above downward and forward, has its upper end mounted on the eccentric 8 and its lower end pivoted at 64 against the inner face of the disk 55. It is by means of the eccentric 8, the connecting-rod 63, the disk 55, which latter is necessarily loose on the shaft 54, and the aforesaid pawl and ratchet, that an intermittent rotary motion is imparted to said shaft in the direction of the arrow in Fig. 2.

Since the pulley 7 is loose on the main shaft 6, it runs constantly, while said shaft is rotated only when a clutch mechanism between said pulley and shaft is thrown into engagement. Such clutch mechanism comprises a bolt 65 which is let into a flanged collar 66 tight on the shaft 6, between the right-hand side piece 4 and the pulley 7, and which bolt is tensioned toward said pulley by a spring 67 pocketed in said bolt and projecting from the left-hand end of the same to bear against the corresponding end of the slot provided in said collar to receive said bolt; and lugs 68 which provide recesses in the hub of said pulley to receive the right-hand end of the bolt, when said bolt is actuated toward said hub by said spring. The parts just mentioned are clearly shown in Figs. 8 and 9.

The clutch bolt 65 is controlled by starting and stopping mechanism which comprises the following parts and members, as illustrated in Figs. 1, 4 and 7: An arm 69 pivoted at its rear end, at 70, to the right-hand side piece 4, extending forward beneath the collar 66, and having a beveled front end 71 which is adapted to enter a slot 72 in the bolt 65; an upwardly, spring-pressed pin 73 carried in a socket 74 on the aforesaid side piece, and bearing against the lower edge of said arm to tension the same upward with said beveled end 71 in said slot or in the path of the left-hand edge of the slot; a lever 75 having its rear end pivoted at 76 to said side piece; a connecting-rod 77 having its upper end pivoted at 78 to the arm 69, and its lower end pivoted at 79 to said lever; an upstanding latch 80 pivoted at 81 to a suitable extension from said side piece, and having a hook 82 adapted to engage the upper edge of the lever; a horizontal rock-shaft 83 suitably journaled in bearings on said side piece, and provided with two rocker-arms 84 and 85, the former and longer one in front of the latter; a vertical connecting-rod 86 having its upper end pivoted at 87 to said rocker-arm 84, and its lower end pivoted at 88 to a treadle 89, and a cam 90 fast on the shaft 50. The treadle 89 is mounted on a rock-shaft 91 suitably journaled in the base 1. The spring 92, which is in the socket 74 beneath the pin 73, is stronger than the bolt spring 67, therefore, owing to the shape of the beveled end 71 of the arm 69, when said arm is released to said spring 92 the latter forces the arm upward and the beveled side of said part 71 is presented to the left-hand side of the slot 72 in the bolt 65, as noted above, so that said bolt is forced to the left, against the resiliency of the spring 67, out of engagement with the hub of the pulley 7, with the result that further motion of the mechanism driven by said pulley ceases. A spring 93 is fastened to the underside of the projection 94, to which the latch 80 is pivoted, and bears against the lower end or tail of said latch and so serves to rock said latch normally into engagement with the lever 75, or to tension the upper end of the latch against said lever, so that when the lever is drawn down the hook 82 will slip over the upper edge of the same. To start the mechanism, it is simply necessary to depress the lever 75 with the hand until the latch hook 82 snaps into place above said lever, because then the arm 69 is depressed against the resiliency of the spring 92, through the medium of the connecting-rod 77, the end or part 71 is drawn out of engagement with the bolt 65, and the spring 67 acts to thrust said bolt to the right into one of the recesses, between the lugs 68, in the hub of the pulley 7. The shaft 6 and all of the mechanism driven thereby or therefrom is now set in motion by the pulley. The mechanism can be stopped by depressing the treadle 89, since the rocker-arm 84 is then drawn down, through the medium of the connecting-rod 86, and the rocker-arm 85, on the same rock-shaft with the rocker-arm 84 and situated to engage the beveled edge of the latch 80 above the hook 82, actuates said latch so as to disengage said hook from the lever 75, and the latter being thus released permits the arm 69 to respond to the spring 92 and the part 71 to force the bolt 65 out of engagement with the pulley.

The clutch is thrown out by means of the treadle 89 at such times as may be necessary for any purpose during what may be termed a "run" of the machine, but such disconnection is automatically produced at the end of each run by means of the cam 90. By a "run" is meant the required operations of the machine and its mechanism necessary to produce a given number of tags, fifty for example, the same being received in the present instance on a triangular tube 94 which has to be removed when it receives its complement of tags. Without some automatic means to stop the machine when the receiving tube 94 is full, injury to the tags or to the mechanism would be liable to occur, therefore the worm 48, worm-wheel 49, shaft 50, and cam 90 are provided. The meshing members are so proportioned and timed that, when fifty tags have been run out on the tube 94, the high part of the cam 90 contacts with the tail of the latch 80, and actuates said latch against the resiliency of its spring 93 to disengage its hook from the lever 75, when the arm 69 draws back the bolt 65 in the manner and by the means before explained. The machine starts again when the lever 75 is swung down once more, the high part of the cam 81 having by this time passed beyond or back of the tail of the latch 80. The direction of rotation of the shaft 50, which carries the cam 81, is indicated by the adjacent arrow, in Fig. 6.

The strip 1 is fed from a supply-roller or reel 95 having its trunnions 96 mounted in standards 97—97 secured at their bases to a bracket 98 fastened against the left-hand ends of the bed 2 and table 3. From the roller 95 the strip $l$ passes between upper and under feed-rollers 99—99, through a suitable run-way or guide-way presently to be described, and between upper and under feed-rollers 100 and 101, respectively, the first pair of feed-rollers being at the left-hand end of such guide-way, and the second pair of feed-rollers being at the right-hand end of such guide-way. The lower feed-roller 99 is tight on a horizontal shaft 102 mounted in suitable bearings on the table 3, and extending at right-angles to the shaft 54 behind the same. The shaft 102 carries on its front end a bevel-gear 103 which meshes with the bevel-gear 56 on the shaft 54. The lower feed-roller 101 is tight on a second shaft 102' which is similarly mounted and situated to the first shaft 102, and carries at its front end a bevel-gear 105 which meshes with the bevel-gear 58. Tight on the rear end of each shaft 102 and 102' is a gear 106. A U-shaped bracket 107 constitutes a part of the bearing or bearings for each shaft 102 and 102', and in the front and back sides of this bracket, between which sides are located the feed-rollers associated therewith, two bearing-blocks 108 are so arranged that they have some vertical movement. These bearing-blocks are received in vertical slots 109—109 in the aforesaid front and back sides or uprights of the bracket, and said blocks have flanges on the inside to bear against the inside faces of said uprights, as best shown in Fig. 11, and assist in guiding the blocks in their up and down movement. A shaft 110 is journaled in each pair of bearing-blocks 108, and has either the upper feed-roller 99 or the upper feed-roller 100 tight thereon, said shaft also has at its back end a gear 111 which meshes with the gear 106 below. The shaft 110, at the right-hand end of the machine, has a pulley 112 tight thereon inside of the associated gear 111. The bearing-blocks 108, in each bracket 107, are tensioned downwardly by means of two vertical springs 113 pocketed in said blocks and bearing at their upper ends against enlargements on the lower ends of vertical adjusting screws 114—114 tapped into and through caps 115 which are bolted to the tops of the bracket uprights across the upper ends of the slots 109. By loosening the set-nuts, with which the screws 114 are provided, and turning said screws up or down the tension on the springs 113 is decreased or increased accordingly, and so also is the tension of the associated upper feed-roller on the associated lower feed-roller or on the strip $l$ between. The feed-rollers and associated parts and members are fully disclosed in Figs. 1, 2, 4, 6, 10 and 11.

As disclosed also in Figs. 1, 2, 4, 6, 10 and 11, I provide means operated by the dogs 35, when the plungers 23 and 24 descend, to raise simultaneously the bearing blocks 108 against the resiliency of the springs 113 and so elevate the shafts 110 with the upper feed-rollers 99 and 100 and the gears 111. This means comprises a rock-shaft 104 journaled in the two caps 115 on each bracket 107, parallel with the adjacent shaft 110, and provided on its front end with an arm 116 that extends inwardly from said rock-shaft into the path of travel of the nearer dog 35, and further provided with an arm 117 that extends from said rock-shaft in the opposite direction to that of said arm 116 and is shorter than the latter arm, a horizontal rod or pivot pin 118 extending both ways from the outer end of said arm 117, a horizontal rod or pivot pin 119 extending between the bearing-blocks 108 in said bracket, above the upper feed-roller in the bracket, and a pair of vertical links 120 connecting said pins. On the free end of the left-hand arm 116 is a forwardly-projecting handle 121, by means of which such arm can be operated by hand. It will now be seen that, when the plungers 23 and 24 descend and as they approach the lower end of their travel, the dogs 35 encounter the long rocker-arms 116 and swing them downward, and that said arms in turn rock the shafts 104 and swing the short rocker-arms 117 upward, and so raise the upper feed-rollers from the lower feed-rollers or from the interposed strip $l$, through the medium of the links 120 and intervening parts; and that when said plungers rise said upper feed-rollers are released to the influence of the springs 113, which latter immediately act to force the bearing-blocks 108 downward again and the upper feed-rollers onto the lower feed-rollers or the interposed strip. Without some means of this kind to separate the feed-rollers so as to release the strip $l$, the accurate spacing of the tag-forming members in said strip would not be possible, there would be considerable waste of material, and the uniform action of the machine would be interfered with. Such separation must and does occur at the instant the punching and forming actions take place, as will be explained hereinafter.

The two feed-rollers 99 and the feed-roller 100 are substantially alike, but the feed-roller 101 has a groove 122 in its periphery of such shape and size as to allow the tags to pass out onto the tube 94. The groove 122 does not, however, interfere with the action of the feed-roller 101 on the skeleton part of the strip $l$, such part being indicated at $s$ in Figs. 11 and 26ª, so that such part is fed forward by the feed-rollers 100 and 101 just as it was fed forward in the first place, while in the whole and unbroken condition of the original strip, by the two feed-rollers 99 at the opposite or entrance end of the machine.

The guide-way or channel for the strip $l$, hereinbefore referred to, is made up of dies and die members supported in and on die-holding blocks 123, 124 and 125, and cover or top plates 126, 127—127, and 128—128, these parts being between the two pairs of feed-rollers and under the plunger blocks 30 and 31. Said guide-way or channel will be found at 129 in a number of the views. The blocks 123, 124 and 125 are bolted to the top of the table 3 in the order named from left to right. The plate 126 is fastened to the top of the block 123, forms the sides and top of the first section of the channel 129, as shown in Figs. 6, 14 and 16, and is cut out at 130 and 131, as shown in Fig. 6; the plates 127 are spaced apart and fastened to the top of the block 124 to form the sides and open top of the second section of said channel, and they are cut away at 132—132, as shown in Figs. 6 and 21; and the plates 128 are spaced apart and fastened to the top of the block 125 to form the sides and open top of the third section of said channel, as shown in Figs. 6, 22 and 24. The adjacent ends of the plates 126 and 127 are spaced apart, and the adjacent ends of said plates 127 and the plates 128 are spaced apart, as is clearly seen in Fig. 6, and the adjacent ends of the blocks 123, 124 and 125 are spaced apart in the same way as just intimated. The bottom of the channel 129 consists of the dies and die members subsequently described. A triangular supporting lug 133, for the inner end of the tube 94, extends to the right from the corresponding end of the member that here forms the bottom of the channel 129, in front of the longitudinal center of said channel—see Figs. 4, 6, 10, 23 and 24. The outer end of the tube 94 is supported on a triangular lug 134 which extends from the right-hand end of a sliding block 135. The block 135 is mounted on a bracket 136 which is fastened on a rod 137, the latter being supported on the floor or otherwise at the right of the machine proper. The block 135 has a part on the bottom that is received in a groove 138 in the bracket 136, and said block is secured to said bracket by means of a thumb-screw 139 which passes through a slot 140 in the bracket into threaded engagement with the block. The groove 138 and the slot 140 are parallel with each other and with the tube 94. These parts are shown in Fig. 11.

The tube 94 passes under the feed-roller 100, in the groove 122 in the feed-roller 101. The distance which separates said tube from said feed-roller 100, when the latter is down on the skeleton part $s$ of the strip $l$, is a trifle less than the thickness of said strip, so that the feed-roller 100 can act on the tags to actuate them along on said tube, provided the action of the moving strip does not do this with sufficient accuracy and regularity. The arrows in Fig. 11 indicate the directions of rotation of the right-hand feed-rollers.

The tube 94 is released and removed from the machine by loosening the thumb-screw 139, sliding the block 135 to the right far enough to free the adjacent end of said tube from the lug 134 and from the block, and then drawing the tube off of the lug 133 and out from between the feed-rollers 100 and 101; and the tube is placed in position by first passing it through the groove 122 and engaging its inner end with said lug 133, and then sliding said block to the left against the outer end of the tube, with said lug 134 in said last-mentioned end, and retightening said thumb-screw.

A winding-roller or reel 141, provided with a pulley 142, is mounted loose on a stud 143 which projects forward from the supporting rod 137 above the bracket 136—Fig. 11. The roller 141 has one or more longitudinal slits 144 in its periphery to receive the end of the skeleton or waste part $s$ of the strip $l$, it being upon this roller that such waste part of said strip is wound and so taken out of the way of the machine and of the newly formed tags as said part leaves the feed-rollers 100 and 101. A cross-belt 145 connects the pulley 142 with the pulley 112 and thus drives the roller 141 in the proper direction to wind up the aforesaid waste.

A roller or rod 300 may be located in convenient relation to the roller 100, between the waste portion $s$ of the strip and the tags, or between the positions assumed by these parts when the machine is in active operation, to serve as a guide for such waste portion upon emerging from between said roller 100 and the roller 101 and to insure the proper separation of said portion from said tags, such roller or rod being mounted in brackets 301—301 fastened to the right-hand edges of the bracket 107 at this end of the machine.

I will next take up in detail the punches and stamps, dies, and other formers, commencing at the left-hand of the groups or sets of the same and describing them in order. Some of these members are denominated as follows: a stamp or punch 146, round in cross-section and flat on the bottom, and a spacer or finder 147, also round in cross-section like said punch and of the same diameter but pointed at the bottom and longer than said punch, and a die-plate 148 for said punch and finder; a stamp or punch 149, a die 150, and a replacer 151, each having a configuration which corresponds to that of a tag-blank $n$; punches or stamps 152 and 153, and a die 154, the two former respectively having on their bottoms V-shaped ribs 155 and 156 which are received into two V-shaped grooves 157 in said last-mentioned die; a clamp 158, an anvil 159, and two rib-closers 160; a tongue-bending punch or stamp 161, and four bed or die plates 162—162ª and 163—163ª; a clamp 164, similar to the clamp 158, an anvil 165, and a tongue-bender 166; a second spacer or finder 167, and a printing- or type-wheel set 168.

The punch 146 and the finder 147 are vertical pins fastened to a holder 169 by a plate 170 bolted to the front of said holder, Figs. 1 and 5. The top of the holder 169 is secured in the plunger-block 30, adjacent to the left-hand end, in the same manner as the tops of other holders are secured therein and which will be explained in connection with one of such other holders. The punch 146 and the finder 147 respectively operate through holes 171 and 172 in the plate 126, Fig. 6, and respectively in passages indicated by dotted lines at 173 and 174, in Fig. 1, in the die-plate 148 below said first-mentioned holes, a portion of such plate appearing in Fig. 14. The member 146 punches holes $t$ in the strip $l$, Figs. 26 and 26ª, for the finders 147 and 167, and said finders insure the proper spacing apart of the tag members in said strip, as will be made clear in the description of the operation of the machine. The parts cut from the strip $l$ by the punch 146 are the only parts, excepting the tags, that are cut out and removed from said strip, and the passage 173 is extended downward through the block 123 and the table 3 so as to enable said first-mentioned parts or punchings to escape and thus avoid clogging the mechanism.

The blank-cutting punch 149 is a vertical member fastened to a holder 175 by a plate 176 bolted to the left-hand side of said holder. The holder 175 is secured to the block 30, in the same way as the other holders, at the right of the holder 169. In addition to the punch 149, the holder 175 is equipped with a square clamp 177 supported below said holder by means of a vertical stem 178 which is introduced from below into a passage 179 in the holder at the right of the punch and has a screw-threaded upper terminal for an adjusting nut 180 and a set-nut 181, a spring 182 being interposed in said passage between the top of the same and a shouldered part of said stem to tension the clamp downward—see particularly Figs. 12 and 13. The threaded terminal of the stem 178 passes through the top of the holder 175, and the nuts 180 and 181 are on said terminal above said holder. The nuts limit the downward movement of the clamp and afford means for adjusting the tension of the spring 182. The clamp 177 is perforated to receive the punch 149 and slides up and down on said punch, and said clamp is adapted to enter the opening 130 in the plate 126 and bear on the strip $l$ below during the punching and replacing operations. The die 150, Fig. 14, has an opening therethrough to receive the punch 149, such opening being shaped like the working face of said die, and both being like a tag-blank n, so that such a blank is punched out of the strip l every time the punch descends. This die and the die 148 are secured in the block 123 in the same manner as is the die 154, for a description of which see a subsequent part of this specification.

Referring to Fig. 14, it will be seen that the replacer 151 operates through the opening in the die 150 and that it stands normally with its upper end or working face flush with the top of said die. Said working face has the same outline as that of the punch 149 and of the die opening. Vertical passages 183 and 184 are provided in the block 123 and the table 3, respectively, for the replacer 151 and its coacting members, the passage 184 being below the passage 183. In the passage 183, at the upper end between an annular shoulder and the die 150, is an annular stop-plate 185 against which strikes a cup-shaped sleeve 186, carried by the replacer, to limit the upward movement of said replacer. The replacer proper rises from a round head 187 at the top of a stem 188, and said stem rests on or receives against its lower end a base-piece 189 which has a chamber 190 therein and opening through the bottom thereof. The base-piece 189 is in the passage 184. The head 187 fits the sleeve 186 to add stability to the replacer. The stem 188 is screw-threaded below the head 187, as shown at 191, and the sleeve 186 and a round set-nut 192 for said sleeve are screwed on to such threaded part. The stem 188 operates through a centering and guiding block 193 fixed in the passage 183. The base-piece 189 has an exterior, annular flange 194 at the bottom which limits the rise of said base-piece by contacting with the under side of the table 3. This protruding end of the base-piece is covered by a cap 195 bolted to the bottom of the table 3. The cap 195 has an annular recess 196 therein to receive the flange 194, such recess being a trifle deeper than the combined thickness of said flange and the strip l. The cap 195 limits the downward movement of the replacer by reason of the fact that the base-piece strikes with its lower end the bottom of the groove 196 when such movement occurs. The vertically-movable parts are tensioned upward, as far as is permitted by the stop members, by means of a spring 197 in the chamber 190. The spring 197 bears between the top of the chamber 190 and a washer 198 which rests on or bears against the shouldered part of a spindle 199 tapped into and through the cap 195. The spindle 199 is provided with the usual set-nut below the cap.

When the holder 175 descends, the clamp 177 enters the opening 130 and comes to rest on the strip l in the channel 129 and securely holds said strip between said clamp and the die 150, and as said holder continues to descend the spring 182 is still further compressed and so increases the tension on said strip and holds it even more securely. Of course the sides of the channel 129 assist in holding the strip, not only at this but at all times. The continued downward movement of the holder 175 forces the punch 149 through the strip and cuts out a blank n, the replacer 151 yielding at the same time, owing to the presence of the spring 197, and receiving such blank as it is pushed into the die. Having descended far enough to cut out the blank, the punch 149 ascends, and the replacer follows it, under the influence of the spring 197, and returns the blank to the place which it occupied in the strip before it was cut therefrom, or replaces it in said strip, before the clamp 177 releases the strip. By the time the replacer has replaced the blank and arrived at its high position, the punch leaves said blank, and then the clamp rises clear of the strip, although thrust downward by the spring 82 as far as the nut 180 will permit. It should be noted that the blank is grasped firmly between the punch and the replacer during the punching and replacing operations. The object in replacing each blank in the strip is for the purpose of utilizing said strip as a conveyer for the blanks or tag-forming members throughout the entire process, and thus being able to make one machine do the work of several and do it to the best advantage.

Next to the right of the holder 175 is a holder 200 for the stamps 152 and 153. There is a longitudinal channel 201 in the underside of each of the blocks 30 and 31, the back edge of which is undercut, and it is in one or the other of these channels that the holders for the different punches or stamps and associated, upper, tag-forming instruments or devices are received and held, the upper portion of each holder being made flaring in front and rear and a wedge bar 202 being employed, as shown in Figs. 5, 15, 17, 20 and 24. The back edge of each bar 202 is inclined to meet the corresponding inclination on the front of the holder 200, or of any companion holder, and said bar fits into one of the channels 201, that in the block 30 for said holder 200, and is there securely bolted in place. The holder 200 is provided with a central clamp 203 which has a stem 204 that extends upward into a passage 205 in said holder, a spring 206 being employed in said passage between the upper end thereof and a shouldered part of said stem to tension said clamp downward as far as nuts, similar to the nuts 180 and 181, on the upper, threaded terminal of the stem will permit. A recess 207 is provided in the part or parts above the terminal of each stem 178 and 204 to accommodate such terminal and the nuts thereon, also for the stem of each of the other two clamps. The stamps 152 and 153 are secured to the holder 200 by means of front and back plates 208 which are bolted to said holder. The stamp 152 is in front of the clamp 203 and the stamp 153 behind said clamp. The rib 156 on the stamp 153 is shorter than the rib 155 on the stamp 152, and these ribs operating in conjunction with the grooved parts 157 of the die 154 produce the rudimentary ribs o—o in each blank n. The rudimentary rib o in the body part of the blank n is struck down by the stamp rib 155, and the rudimentary rib o in the tail of said blank is struck down by the stamp rib 156. The clamp 203 is arranged and adapted to enter the opening 131 in the plate 126. The die 154 is set and held firmly in a channel 209 (similar to the channels 201) in the block 123 by means of a wedge bar 210 (similar to the bars 202) bolted in place in said channel 209.

In practice, having special reference to Figs. 1, 5, 6, 15 and 16, when the holder 200 descends the clamp 203 enters the opening 131 and presses hard on the strip l before the stamps 152 and 153 act to strike down the rudimentary ribs o from the blank n between said stamps and the die 154, the action of said clamp and the effect produced by such action being very similar to the action and effect described in connection with the clamp 177, with this exception: In the first case the clamp 177 does not bear on that part of the strip l from which the blank is cut nor upon the blank after being cut out, while in the second case the clamp 203 bears on a part of the blank as well as on adjacent parts of the strip. Since the blank is clamped in the middle laterally, the shortening resulting from the action of the stamp ribs 155 and 156, whereby the rudimentary ribs o are produced, occurs at the ends.

Next in order is a holder 211 for the clamp 158 which is directly over the anvil 159. The clamp 158 is long enough to cover the blank and it is designed to hold the same securely on the anvil 159 when the rib closers 160 act to transform the rudimentary ribs o—o into the perfected ribs j and k. This clamp has a stem in a passage in the holder, with nuts on the upper terminal of said stem, and a spring to tension said clamp downward, as shown in Fig. 17, which are just like corresponding parts in Fig. 15. The anvil 159 is located between the ends of the blocks 123 and 124, and the uppermost edge of said anvil is on a level with that portion of the bottom of the channel 129 that extends to the right from the die 154 and has longitudinal parallel grooves 212 therein which are a continuation of the grooves 157, and with the adjacent ends of the die-plates 162 and 163 so that said uppermost edge forms part of the bottom of said channel which is continuous at this point in its central portion. The length of the aforesaid uppermost edge of the anvil is equal to the distance between the aforesaid grooves, and the front and back edges of the anvil drop down vertically from the ends of said uppermost edge as shown in Fig. 18. It is against the front and back edges just mentioned of the anvil that the working faces, that is, the inner or adjacent ends, of the rib-closers 160 operate, or rather it is between said edges and said faces that the rudimentary ribs o are closed to form the ribs j and k.

The rib closers 160 are horizontal bars for which horizontal, reciprocating slides or carriers 213—213, Figs. 6 and 18, are provided. Each rib-closer is received in its carrier 213 and projects well beyond the inner end of the same. A plate 214 is bolted to each carrier over the rib-closer therein to assist in retaining the latter in place, and a horizontal adjusting bolt 215 is tapped into the outer terminal of said carrier and extends inward to bear against the outer end of said rib-closer for the purpose of holding the same against outward displacement and to afford means for adjusting the rib-closer and determining the amount of its inward protrusion. The carriers 213 are mounted to slide in suitable longitudinal grooves in two supporting blocks 216 bolted on the top of the table 3 in front of and behind the longitudinal center of said table and arranged at right-angles to said center. Reciprocating motion is imparted to the front carrier 213 through the medium of a vertical shaft 217 journaled in the corresponding block 216 and provided with a vertical crank-pin 218, which rises from its head into operative connection with said carrier, and having a bevel-gear 219 on its lower terminal in mesh with the bevel-gear 53 on the shaft 45. The crank-pin 218 enters an opening 220 in a rectangular slide 221 which operates in a transverse groove 222 in the under-side of the carrier, hence as said pin is carried around by the shaft 217 said carrier is reciprocated, said slide traveling back and forth in said groove to bring about this result and convert the rotary motion of the shaft into a reciprocating motion for the carrier. Similar means is employed for reciprocating the rear carrier 213, the motion in this case being derived from the bevel-gear 51 on the shaft 44. The driving or actuating mechanisms for the two carriers are so set or arranged relatively that the rib-closers are caused to approach each other and recede from each other in exact synchronism.

The tongue-bending stamp 161 operates in conjunction with a clamp 223, Figs. 1, 5 and 20, and both are similar in construction and operation to the punch 149 and the clamp 177, and are similarly secured to and operatively connected with a holder 224, which holder is the last one at the right-hand end of the block 30, excepting that the stamp 161 is behind the stem 178 of the clamp 223 instead of at the left of it as in the other case, and said stamp is adapted by reason of its shape and location to engage the tail of the blank n, and the tail only, for the purpose of turning said tail down so that it will stand at right-angles to the body portion of said blank. The clamp 223 in descending enters the openings 132 in the plates 127 and presses the blank n hard against the bottom of the channel 129 at this point, such bottom here being formed by abutting ends of the plates 162 and 163 and adjacent portions of the plates 162$^a$ and 163$^a$. A vertical slot 225 is cut out of the plate 163$^a$ and down into the block 124 beneath, Figs. 6 and 21, in proper position to receive the stamp 161 when it descends, together with the tail or tongue bent down by said stamp. A longitudinal groove 226, for the tag rib $j$, extends from the right-hand end of the front groove 212 throughout the entire lengths of the plates 162 and 163, and continues across the anvil 165 and throughout the entire length of a bed-plate 227. It may be noted here that the bed-plate 227 and a companion bed-plate 227$^a$ together comprise the last section of the bottom of the channel 129; furthermore, that the manner of securing the plates 162, 163, 162$^a$ and 163$^a$ to the block 124, and the plates 227 and 227$^a$ to the block 125, is apparent upon inspection of Figs. 6, 21 and 24. A longitudinal groove 228 for the tag-rib $k$ extends, in the plate 162$^a$, from the right-hand end of the back groove 212 to the slot 225. When the blank n arrives with its tail over the slot or recess 225, said blank is clamped and the tail bent down over the front edge of said recess by the stamp 161. An approximately central, longitudinal, vertical slot 229, Figs. 6 and 22, which is the space between adjacent edges of the plates 163 and 163$^a$, such plates being spaced apart for the purpose, leads from the recess 225 to the opposite ends of said plates, and it is this slot through which the downwardly-extending tag tongue passes as the blank is actuated from the place where said tongue was bent straight down to that where it is to be bent forward at an incline.

The clamp 164, practically identical in all respects with the clamp 158, is similarly arranged in a holder 230 secured to the plunger-block 31 adjacent to the left-hand end thereof. This holder is also similar to the holder 211. The clamp 164 secures the strip $l$ and holds the blank on the anvil 165 while the tongue-bender 166 comes up behind the tongue and deflects it out of a vertical position, leaving said tongue with a forward inclination, so that the tag, of which such tongue constitutes a part, when finished, can be readily closed on and attached to any suitable article. The blank, which has now been almost transformed into a finished tag, when it arrives on the anvil 165 has its tongue depending straight down over the back edge of said anvil, as shown in Fig. 22. With said back edge of the anvil as a fulcrum the bender 166 deflects the tongue out of the perpendicular, when said bender advances, owing to the fact that said anvil is undercut below said edge, being slanted downward and forward therefrom, and to the further fact that the upper, forward portion or terminal of said bender is slanted in a corresponding manner or parallel with the first-mentioned slanted surface, as shown. The manner in which the tongue-bender 166 is mounted and the mode of its operation are the same as has been described in connection with the rib-closers 160, the carrier 213 for said bender being reciprocated in a third block 216 by a third bevel-gear 219, in mesh with the bevel-gear 52 on the shaft 44. The third block 216 is behind the space between the blocks 124 and 125, and the tongue-bender when actuated forward enters the space left between adjacent ends of the plates 163$^a$ and 227$^a$, and advances to a point between the plates 163 and 227 under the rearwardly-projecting part of the anvil 165. As will have already been observed, the anvil 165 is situated between the blocks 124 and 125 and between the plates 163 and 227. The plates 227 and 227$^a$ are spaced apart and their adjacent edges are inclined forward out of the perpendicular, instead of being vertical like the sides of the slot 229, to form a slot 231, Figs. 6 and 24, for the passage of the tag tongue in its new condition of deflection. The top of the slot 231 is in line with the top of the slot 229. The lug 133 projects from the outer end of the plate 227 in front of the corresponding end of the slot 231 and in position to support the tube 94 at its inner end and in proper relation to the face-pieces and the tongues of the tags as they advance, so that said tags can readily pass out onto said tube. The second finder, 167, is fastened, by means of a back plate 232 and bolts, in a holder 233 which depends from the plunger-block 31 near the outer end of said block. This finder and the holding means therefor are similar to the finder 147 and its holding means, and the office of the second is identical with that of the first. The finder 167, when depressed, passes through one of the holes $t$ into a vertical opening or passage 234, Fig. 6, in the plate 227$^a$.

At the right of the holder 233 and immediately adjacent to the outer end of the block 31 is a holder 235 which supports the type-wheel set 168, such holder being secured at its upper end in said block just as the other holders are secured either in this or the other plunger-block. The bottom characters on the type-wheel set are printed on the face-piece *h*, back of the crease therein, when the tag arrives beneath said characters and said set descends, such face-piece then being on the plate 227 with the tongue *i* in the slot 231. The type-wheel set comprises four, more or less, disks with the characters on their periphery, and these disks are mounted loose on a horizontal stud 236 which is supported by two arms 237 that are fastened to the holder 235 and extend below the same. Each of the aforesaid disks has a series of holes 238 therein to receive a pin 239, which pin also passes through holes in the arms 237. When the pin 239 is withdrawn, the disks can be turned to form any desired combination of characters within the scope of the device, then said pin is replaced, by inserting it in the holes provided in the arms 237 to receive it and in the disk holes 238 which aline with each other and with said first-mentioned holes, for the purpose of locking the parts together. See more particularly, in this connection, Figs. 23 and 24.

Although I prefer to employ the paper strip *m*, the same might be omitted, and in that event it would be necessary to construct the printing disks so that they would punch their characters into the metal of the tag, provided it were still desired to mark the tag in this machine, but with the present and preferred arrangement such characters are printed, hence an inking device and operating mechanism therefor is required, such as I have illustrated in Figs. 23, 24 and 25. This inking device and its mechanism are described as follows: A hanger 240 is fastened against the back side of the plunger 24, and this hanger consists in part of two rearwardly-extending members 241 between which are mounted three ink-supply rollers 242, 243 and 244, the shaft 245 of each of said rollers being journaled in said hanger members. The shafts 245 of the middle roller 243 and the roller 244 below that are received at each end in horizontal slots 246—246 in each member 241, and said shafts are tensioned rearwardly in said slots by means of a spring 247 at each end which spring is attached at the center to a pin 248, projecting from the outer face of said member 241, and is arranged so as to bear with its free terminals on the front of the shafts. The ink-supply rollers are arranged one above the other, as shown, and an open-bottom ink reservoir or tank 249 is adjustably supported in proper relation to the roller 242 by means of a lug 250, which projects rearwardly from a supporting plate 251 for said tank, and a spring 252 on a lug 253 that projects rearwardly from the hanger 240 through a slot 254 in said plate, a vertical adjusting screw 255 passing through said lug 250 and said spring into threaded engagement with said lug 253. The screw 255 is shouldered above the lug 250, and the spring 252 bearing as it does between said lug and the lug 253 below retains the lug 250 in contact with the shouldered part of the screw. By turning the screw 255 up or down the amount of space between the open bottom of the ink-tank and the roller 242 is increased or decreased accordingly, since the spring 252 acts on the one hand to raise the vertically-movable members, and the lug 250 is forced downward, against the resiliency of said spring, nearer the lug 253 on the other hand. The ink-supply rollers are located in the field of action of a rotatable inking-disk 256 mounted on an oscillatory arm 257, when said disk is in its elevated position, and so transfer ink from the tank 249 to the face of said disk. The springs 247 project the rollers 243 and 244 into the path of the inking-disk in such a way that, when said disk is elevated, it must force said rollers forward a little against the resiliency of said springs, hence the necessary degree of forcible contact between rollers and disk to properly ink the latter is obtained. This is made possible by the slots 246. The arm 257 is pivoted intermediate of its ends, at 258 to a suitably-supported bracket 259, and carries the inking-disk 256 at its front end. The arm 257 supports and oscillates the inking-disk in a vertical plane which encroaches somewhat on the peripheries of the rollers 243 and 244 at the back, but clears the roller 242 and is some distance behind the type-wheel set 168, the axis of said disk being at right-angles to the axes of said rollers and said type-wheel set. The inking-disk is also behind the block 25. Fast on the back of the disk 256 is a ratchet-wheel 260, and these members are mounted loose on a stud 261 which is secured to the front end of the arm 257. A pawl 262 has its base pivoted at 263 to an upright 264, and is pressed into engagement with the teeth on the ratchet-wheel 260 by a spring 265 which is also attached to said upright. The upright 264 is fastened to the back side of the base of the block 25 and supports the pawl 262 in operative position relative to the ratchet-wheel 260. A vertical connecting-rod 266 has its upper end pivoted at 267 to the back side of the plunger 24, and its lower end pivoted at 268 to the rear end of the arm 257. Therefore, as the plunger 24 rises and falls, the connecting-rod 266 rocks the arm 257 on its pivot 258 and causes the inking-disk to be lowered and raised accordingly; and every time said disk is lowered its ratchet-wheel 260 is partially rotated by the pawl 262, and so is the disk, and every time said disk is raised said ratchet-wheel clicks by said pawl into position to be further rotated when next the disk descends. Thus it is that the inking-disk is intermittently brought into contact with the two lower ink-supply rollers and rotated so as to ink all parts of the face of the disk and regularly present fresh portions of its inked surface to an ink-transfer roller 269.

The ink-transfer roller 269 is mounted loose at the lower end of a slide 270. The slide 270 is attached by a screw 271 to the long arm of a bell-crank-lever 272 pivotally mounted at 273 to the outer end of the holder 235. A longitudinal slot 274 in the slide 270, for the screw 271, is provided so as to enable the roller 269 to be properly adjusted when said screw is loosened. A socket 275 is bolted to the outer end of a projecting part of the plunger 24, and slidingly mounted in said socket is a vertical plunger-pin 276 having a head 277. A spring 278 is located in the socket 275, between an internal flange at the base thereof and the head 277, to tension the plunger-pin upwardly and serve as a cushion for the parts connected with said pin, when the latter is forced downwardly, so that undue shock and strain are avoided. A vertical screw 279 is tapped into the head 277, and is adapted to strike against an overhanging part of the adjacent side piece 4, when the plunger 24 rises, to depress the plunger-pin. A link 280 pivotally connects the lower, protruding end of the pin 276 with the short arm of the bell-crank-lever 272, at 281 and 282, respectively. The outer end of the block 31 is cut away at 283 to accommodate the short arm of the bell-crank-lever. A nut or flange 284, at the base of the plunger-pin 276, above the pivot 281, limits the upward movement of said pin by contacting with the base of the socket 275. The combined length of the long arm of the bell-crank-lever and the slide 270, when said parts are properly adjusted, is such that the roller 269 can be wiped across the faces of the type at the bottom of the printing-wheel set. By adjusting the screw 279 up or down, the amount of forward throw given the roller 269 is decreased or increased, provision being thus made to insure the thorough inking of the aforesaid type. It should be noted, in this connection, that the axis of the pivot 273 is in the same vertical plane with the axis of the stud 236, and that the arc of a circle along which the upper periphery of the roller 269 passes, as the long arm of the bell-crank-lever is swung forward, touches the type that are in printing position. The spring 278 normally positions the parts with the flange 284 against the socket 275 and the roller 269 in contact with the inking surface of the disk 256. In practice, assuming that the plunger 24 is up, the plunger-pin 276 is in its low position, the ink-transfer roller 269 is in contact with the type, and the disk 256 is down out of contact with the ink-supply rollers 243 and 244, as best shown in Fig. 23; now, upon the descent of said plunger, the pin 276 rises, under the influence of its spring, and through the medium of the link 280 and the bell-crank-lever actuates said roller 269 backward into contact with said disk, leaving the inked type free to print on the tag face-piece $h$ in the channel 129 below, and at the same time the connecting-rod 266 depresses the rear end of the arm 257 and elevates the disk into contact with said rollers 243 and 244, the parts being disposed as shown in Figs. 24 and 25. When the plunger 24 ascends again, it brings about a reverse movement on the part of the arm 257 and, as the inking-disk with its ratchet-wheel 261 descends, said disk is partially rotated, by said ratchet-wheel acting on the pawl 262, while the disk is still in contact with the rollers 243 and 244 and the roller 269 is still in contact with the disk, but before the end of the downward travel of said plunger is reached the disk passes away from said first-mentioned rollers and the plunger-pin screw 279 encounters the frame of the machine and causes said roller 269 to be swept forward from the disk and wiped beneath the printing-wheel set and across the type at the bottom thereof, all through the medium of the intervening and carrying parts and members. The rollers 243 and 244 are rotated every time the inking-disk is raised into contact therewith and again when said disk is lowered out of such contact, by the oscillatory movements themselves, and this results in a thorough and free distribution of the ink from the tank 249, through the medium of the roller 242 which is rotated by the roller 243 whenever the latter is rotated, to the disk. The movements and actions of the inking mechanism, as above set forth, occur at every full stroke of the plunger 24.

The operation of the machine as a whole is, briefly, as follows, it being assumed that all parts are disposed in positions that may be termed normal and that they are at rest, as indicated in the general views, with the exception of the driving pulley 7 which should be in motion. The free end of the strip $l$ is first led from the supply-roller or reel 95, between the adjacent feed-rollers 99, and pushed into the adjacent open end of the channel 129 until it is between the hole 171 in the plate 126 and the passage 173 which is in line with said hole, the left-hand lever or arm 116 being temporarily depressed with the hand, by means of the handle 121, in order to raise the upper roller 99 for the passage of the strip. Next the lever 75 is depressed to withdraw the arm 69 from locking engagement with the bolt 65 and allow said bolt to be thrust by its spring into engagement with the pulley 7, when the shaft 6 commences to revolve and to impart a constant rotary motion to the shafts 44 and 45, through the medium of the shafts 39 and 40 and the bevel-gears carried thereby, and to the shaft 50, through the medium of the worm 48 and the worm-wheel 49, and to impart an intermittent rotary motion to the shaft 54, through the medium of the eccentric 8, the connecting-rod 63, and the pawl and ratchet mechanism which includes the disk 55 loose on said shaft 54. At the initial descent of the plungers 23 and 24 the first hole $t$ in the strip $l$ is made by the punch 146. At this time or during the downward movement of the plungers, the feed-rollers are all inactive, because the eccentric 8 is so placed on the shaft 6 relative to the cranks 12 that it is raising the connecting-rod 63 and thereby partially rotating the disk 55 in the direction opposite to that indicated by the arrow, in Fig. 2, to bring about a new engagement between the pawl 59 and the ratchet-wheel 57. Now, as the shaft 6 continues its first revolution, the plungers are elevated and motion is imparted to the feed-rollers to actuate the strip $l$ forward in the channel 129, such motion being imparted by the eccentric which in making the last half of its first revolution thrusts the connecting-rod 63 downward and so carries the disk 55, the pawl 59, the ratchet-wheel 57 and the shaft 54 all over in the direction of the arrow last mentioned. The amount of movement thus imparted to the strip $l$ should be the same every time, in order to maintain equal distances between the holes $t$, one of which is made every time the punch 146 comes down, so that the blanks $n$, the tails of which project between each pair of such holes, can be cut out regularly, and to this end the finders 147 and 167 are provided, also the means whereby the upper feed-rollers are raised from the strip. As the punch 146 is about to make the second hole $t$, the finder 147 enters the first hole $t$ and, being pointed, readily shifts the strip to the right or left, if said strip be not in exactly the proper position, and in any event holds the strip during the punching operation against endwise movement. When the strip reaches the finder 167 the latter coacts with the finder 147 to position and hold the strip for equidistant punching and stamping thereof and subsequent action on the blanks $n$. The spacing action of the finder or finders is rendered possible by reason of the fact that, at the time of this action, not only are the feed-rollers at rest, else no punching, stamping and forming operations could take place, but the upper feed-rollers 99 and 100 are elevated from the strip through the medium of the arms 116 and intervening parts, said arms being rocked downward by the dogs 35 when the plungers 23 and 24 descend. The lifting of the upper feed-rollers occurs just before the finder or finders enters or enter the strip, and said rollers are released and restored to active position and condition before rotary motion is again imparted to them, such release and restoration resulting from the ascent of the plungers and the consequent removal of the dogs 35 from contact with the arms 116. It will be remembered that the bottom of the channel 129 is made up of the plate 148, die 150, replacer 151, die 154, anvil 159, plates 162 and 162$^a$, plates 163 and 163$^a$, anvil 165, and plates 127 and 127$^a$; and that it is through this channel that the strip is being fed. Step by step it is advanced by the intermittently-operating feed-mechanism, the advance being accurately gaged by the first finder and later by both finders, hole after hole is punched therein, and when the die 150 is reached the first blank $n$ is punched or stamped therefrom by the punch 149 and returned or pushed up into the strip by the replacer 151. As the strip passes along the blanks are stamped out at regular intervals. When the first blank $n$ arrives and pauses on the die 154 the stamps 152 and 153 come down and produce the two rudimentary ribs $o$ on the underside of the blank. Said blank next passes onto the anvil 159, and while there held between said anvil and the depressed or lowered clamp 158 the rib-closers 160 are actuated inward, through the medium of the reciprocating mechanism for their carriers 213, to close the rudimentary ribs. Each blank has the rudimentary ribs struck down by the stamps 152 and 153, and then slides along to the anvil where these ribs are closed, as stated, said rudimentary ribs moving in the grooves 212 in the plate 148. The mechanism is so timed that the rib-closers 160 are advanced to the full extent of their inward travel while the plungers are down, and retracted to their extreme outward limits of travel while said plungers are up, the rotary and reciprocating parts between the bevel-gears 51 and 53, on the shafts 44 and 45, respectively, and said rib-closers furnishing the reciprocating medium for the rib-closers, as explained. With the ribs $j$ and $k$ respectively in the grooves 226 and 228, in the plates 162 and 162$^a$, respectively, the blanks advance successively to present their tails, one at a time, over the opening 225, where the stamp 161 bends said tails vertically downward. Then, with the ribs $j$ in the groove 226 in the plate 163 and the vertical tails or tongues in the slot 229 between said plate and the plate 163$^a$, the blanks advance successively onto the anvil 165, where the tongue-bender 166 acts to give each tongue a forward inclination, while the clamp 164 is in operative position. The mechanism is timed so that the operation of the tongue-bender 166 occurs with the operation of the rear rib-closer 160. With their ribs *j* in the groove 226 in the plate 227 and their tongues *i* in the inclined slot 231 between said plate and the plate 227ª, the tags, now complete except for the printing, are moved to the right, still being in the grasp or embrace of the strip, and brought into position beneath the type-wheel set 168, which latter is brought down at the proper time to print each of the tags. The strip in this part of the channel 129 has, meanwhile, been brought under the influence of the finder 167, and continues under such influence until said strip is nearly ready to pass out of the machine. After the tags have been printed they are carried forward by the strip onto the tube 94 as far as the feed-rollers 100 and 101, where they part company with said strip, since the latter or what is left of it is led from between said rollers up, over the roller or rod 300, to the winding-roller 141, as soon as it is long enough, where it is fastened in one of the slits 144 and upon which it is wound, said winding-roller being intermittently rotated for that purpose with said feed-rollers by the pulley 142, the belt 145, and the pulley 112 on the right-hand shaft 110. The tags pass through the groove 122 in the feed-roller 101, and, after becoming separated from the skeleton part *s* of the strip, are pushed forward on the tube 94 by the advancing tags behind. By the time the required number of tags is received on the tube 94, the slowly rotating cam 90 has made one revolution and is ready to knock off the latch 80, which it does and stops the machine by releasing the lever 75 and enabling the spring 92 to throw up the arm 69 and thus withdraw the bolt 65 from the hub of the pulley 7. This is the final act which the machine performs automatically. The cam 90 must, of course, be so set on the shaft 50 that it commences its revolution with the high part of the cam just behind the tail of the latch 80. By changing this cam, or the worm and worm-wheel, or all three, runs of more or less than fifty tags can be made automatically, it being necessary merely to ascertain the number of revolutions of the shaft 44 which corresponds with the predetermined number of tags, and then to provide a worm and worm-wheel of the right proportions and the proper cam to insure the disconnection of the pulley or the release of the main shaft from said pulley when said predetermined number of tags has been made. The loaded tube must now be removed from the machine and an empty tube put in its place, then the machine is started for another run.

It will be understood that, as soon as the strip *l* extends the entire length of the channel 129, all of the punching, stamping, forming and printing operations take place at every cycle of the machine, so that the machine turns out a tag at every such cycle, although the several elements engaged in producing the tags act at each cycle upon different parts of the strip and upon different tag elements.

Although I have shown and described a practical form of my invention as embodied in an operative, efficient and complete machine, I do not desire or intend to be restricted to such embodiment, inasmuch as changes in the construction and arrangement of some or all of the parts may be made without departing from the nature of my invention or violating the spirit thereof. On this account, therefore, specific terms, employed to describe what is illustrated in the accompanying drawings, are in most if not all cases to be interpreted broadly and to be considered as including the widest range of mechanical equivalents that the claims will warrant.

What I claim as my invention, and desire to secure by Letters Patent, is—

1. In a tag machine, constantly-operating stamp mechanism, including means initially to cut blanks successively from a strip and replace them therein and means subsequently to operate on such replaced blanks to change the form thereof while in the strip, means to guide said strip on a given plane and to maintain it on such plane throughout the entire tag-forming operation, intermittently-operating feed mechanism for such strip, and means to utilize such strip as an actuating medium for the tag members during such tag-forming operation.

2. The combination, in a tag machine, with means to advance a strip at regular intervals, of means to punch a blank from such strip and coacting means to replace such blank in the strip, and means to form ribs on said blank.

3. The combination, in a tag machine, with means to advance a strip at regular intervals, of means to punch a blank from such strip and coacting means to replace said blank in the strip, means to stamp rudimentary ribs on the blank, and means to close said ribs.

4. The combination, in a tag machine, with means to advance a strip at regular intervals, of means to punch a blank from such strip and coacting means to replace such blank in the strip, means to stamp rudimentary ribs on the blank, means to close such ribs, and means to bend down the tail or tongue of the blank.

5. The combination in a tag machine, with means to advance a strip at regular intervals, of means to punch a blank from such strip and coacting means to replace such blank in the strip, means to stamp rudimentary ribs on the blank, means to close such ribs, means to bend down the tail or tongue of the blank at right-angles to the main portion thereof, and means to give said tongue a forward inclination.

6. The combination, in a tag machine, with means to advance a strip at regular intervals, of means to punch a blank from such strip and coacting means to replace such blank in the strip, means to bend down the tail or tongue of said blank, and means to print on the main portion or face-piece to which said tongue is attached.

7. The combination, in a tag machine, with means to advance a strip at regular intervals, of means to punch a blank from such strip and coacting means to replace such blank in the strip, means to stamp rudimentary ribs on the blank, means to close such ribs, means to bend down the tail or tongue of the blank at right-angles to the main portion thereof, means to give said tongue a forward inclination, and means to print on said main portion or face-piece of the tag thus formed.

8. In a tag machine, a channel for a tag-strip, feed-rollers adjacent to the delivery end of said channel, intermittently-operating actuating mechanism for said rollers, a suitably-supported stationary tag-receiving member leading from said delivery end of the channel out between said feed-rollers a suitably-mounted winding-roller for the waste portion of said strip, such winding roller being located beyond said feed-rollers and above the plane of said tag-receiving member, and means to drive said winding-roller concomitantly with the feed-rollers.

9. In a tag machine, a channel for a tag-strip, feed-rollers adjacent to the delivery end of said channel, means to actuate said rollers intermittently, a stationary tag-receiving member leading from said delivery end of the channel out between said feed-rollers, releasable holding means for said member, a suitably-mounted winding-roller for the waste portion of said strip, such winding-roller being located beyond said feed-rollers and above the plane of said tag-receiving member, and means to drive said winding-roller concomitantly with the feed-roller, the lower feed-rollers being grooved to accommodate the tag-receiving member and to permit the tags on said member to pass between the feed-rollers.

10. The combination, in a tag machine, with a channel for a tag-strip, a pair of feed-rollers for said strip adjacent to one end of said channel, means to actuate said rollers intermittently, and mechanism for relaxing the pressure of the feed-rollers on the strip between, such mechanism consisting in part of an operating arm, of vertically-reciprocating stamp-carrying and -operating means provided with a part arranged and adapted, when said stamp-carrying and -operating means descends, to contact with said arm and thereby operate said roller-relaxing mechanism to release the strip.

11. The combination, in a tag machine, with a channel for a tag strip, a pair of feed-rollers for such strip adjacent to one end of said channel, means to actuate said rollers intermittently, and mechanism for relaxing the pressure of the feed-rollers on the strip between, such mechanism consisting in part of an operating arm, of vertically-reciprocating stamp-carrying and -operating means consisting in part of a strip-adjusting device and provided with a member arranged and adapted, when said stamp-carrying and -operating means descends, to contact with said arm and thereby operate said roller-relaxing mechanism to release the strip, whereby said strip-adjusting device is permitted to act on the strip.

12. The combination, in a tag machine, with a channel for a tag-strip, a pair of feed-rollers for such strip adjacent to the receiving end of said channel, a pair of feed-rollers for such strip adjacent to the delivery end of said channel, one of the rollers in the second pair being grooved to admit of the passage of tags, means to actuate said rollers simultaneously but intermittently, and mechanism for relaxing the pressure of both pairs of feed-rollers on the strip between the rollers in the two pairs, of stamps, means independent of such stamps to adjust the strip, carrying and operating means for said stamps and said strip-adjusting means, and means to operate said roller-relaxing mechanism to release the strip at every positive or active stroke of said strip-adjusting means, whereby said strip-adjusting means is permitted to act on the strip.

13. In a tag machine, means to intermittently feed a tag-strip, means to punch blanks from and return them to said strip so that the latter serves as a conveyer for the blanks and tags during the tag-forming operation, means to form said blanks into tags while still in the strip and after being returned thereto, and means to separate the finished tags from the waste part of the strip at the end of said tag-forming operation.

14. In a tag machine, means to punch a blank from a tag-strip and replace it therein, and means to stamp rudimentary ribs on a blank previously cut from said strip and replaced therein, at a single operation.

15. In a tag machine, means to punch a blank from a tag-strip and replace it therein, means to stamp rudimentary ribs on a blank previously cut from said strip and replaced therein, and means to close the rudimentary ribs on still another blank previously prepared, all at a single operation.

16. In a tag machine, means to punch a blank from a tag-strip and replace it therein, means to stamp rudimentary ribs on a blank previously cut from said strip and replaced therein, means to close the rudimentary ribs on still another blank previously prepared, and means to bend down the tail or tongue of a blank in the strip ahead of that last mentioned, all at a single operation.

17. In a tag machine, means to punch a blank from a tag-strip and replace it therein, means to stamp rudimentary ribs on a blank previously cut from said strip and replaced therein, means to close the rudimentary ribs on still another blank previously prepared, means to bend down the tail or tongue of a blank in the strip ahead of that last mentioned, and means to give a forward inclination to the tongue of a blank in the strip in advance of all of the others, all at a single operation.

18. In a tag machine, means to punch a blank from a tag-strip and replace it therein, means to bend down the tongue of a blank in the strip ahead of that last mentioned, and means to print on a tag previously formed from a blank and carried by the strip in advance of the blanks, all at a single operation.

19. In a tag machine, means to punch a blank from a tag-strip and replace it therein, means to stamp rudimentary ribs on a blank previously cut from said strip and replaced therein, means to close the rudimentary ribs on still another blank previously prepared, means to bend down the tongue of a blank in the strip ahead of that last mentioned, means to give a forward inclination to the tongue of a blank in the strip in advance of all of the others, and means to print on a tag previously formed from a blank and carried by the strip in advance of the blanks, all at a single operation.

20. In a tag machine, means to punch a finder hole in a tag-strip, means to punch a blank from said strip and replace it therein, and means to stamp rudimentary ribs on a blank previously cut from said strip and replaced therein, at a single operation.

21. In a tag machine, means to punch a finder hole in a tag-strip, means to punch a blank from said strip and replace it therein, means to stamp rudimentary ribs on a blank previously cut from said strip and replaced therein, and means to close the rudimentary ribs on still another blank previously prepared, all at a single operation.

22. In a tag machine, means to punch a finder hole in the tag-strip, means to punch a blank form said strip and replace it therein, means to stamp rudimentary ribs on a blank previously cut from said strip and replaced therein, means to close the rudimentary ribs on still another blank previously prepared, and means to bend down the tail or tongue of a blank in the strip ahead of that last mentioned, all at a single operation.

23. In a tag machine, means to punch a finder hole in a tag-strip, means to punch a blank from said strip and replace it therein, means to stamp rudimentary ribs on a blank previously cut from said strip and replaced therein, means to close the rudimentary ribs on still another blank previously prepared, means to bend down the tongue of a blank in the strip ahead of that last mentioned, and means to give a forward inclination to the tongue of a blank in the strip in advance of all of the others, all at a single operation.

24. In a tag machine, means to punch a finder hole in a tag-strip, means to punch a blank from said strip and replace it therein, means to stamp rudimentary ribs on a blank previously cut from said strip and replaced therein, means to close the rudimentary ribs on still another blank previously prepared, means to bend down the tail or tongue of a blank in the strip ahead of that last mentioned, means to give a forward inclination to the tongue of a blank in the strip in advance of all of the others, and means to print on a tag previously formed from a blank and carried by the strip in advance of the blanks, all at a single operation.

25. The combination, in a tag-machine, with a channel having its bottom consisting in part of a blanking die, a rudimentary rib-forming die, an anvil, and a recessed tail-receiving part, of stamp-carrying and -operating means.

26. The combination, in a tag-machine, with a channel having its bottom consisting in part of a blanking die, a rudimentary rib-forming die, an anvil, a recessed tail-receiving part, and a second anvil, of stamp-carrying and -operating means.

27. The combination, in a tag-machine, with a channel having its bottom consisting in part of a blanking die and a blank replacer, a rudimentary rib-forming die, an anvil, and a recessed tail-receiving part, of stamp-carry and -operating means.

28. The combination, in a tag machine, with a channel having its bottom consisting in part of a blanking die and a blank replacer, a rudimentary rib-forming die, an anvil, a recessed tongue-receiving part, and a second anvil, of stamp-carrying and -operating means.

29. The combination, in a tag machine, with a channel having its bottom consisting in part of a blanking die, a grooved rudimentary rib-forming die, an anvil, and an intervening portion between said last-mentioned die and said anvil, which portion is grooved like said rib-forming die, of stamp-carrying and -operating means.

30. The combination, in a tag machine, with a channel having its bottom consisting in part of a blanking die, a grooved rudimentary rib-forming die, an anvil the length of the uppermost surface of which is equal to the width of the space between the grooves in said rib-forming die, an intervening portion between said rib-forming die and said anvil, which portion has grooves therein in line with said first-mentioned grooves, a recessed tongue-receiving part, and a grooved portion leading to said part from said anvil, of stamp-carrying and -operating means.

31. The combination, in a tag machine, with a channel having its bottom consisting of a blanking die, a grooved rudimentary rib-forming die, an anvil, a grooved portion leading from said rib-forming die to said anvil, a recessed tongue-receiving part, a grooved portion leading from said anvil to said tongue-receiving part, a second anvil, a grooved and slotted portion leading from said tongue-receiving part to said second anvil, and a grooved and slotted portion leading from said second anvil to the delivery end of said channel, the slot in said last-mentioned portion being inclined out of the perpendicular, of stamp-carrying and -operating means.

32. The combination, in a tag machine, with a channel, and intermittently-operated means for actuating a tag-strip through said channel, of means to cut out and form tags from said strip, and means to clamp said strip and its parts in the channel during the cutting and forming operations, such clamping and cutting and forming means being active while the strip-actuated means is inactive.

33. The combination, in a tag machine, with a channel for a tag-strip, means to clamp from above a blank in said channel, which blank has been cut from and replaced in said strip and has rudimentary ribs struck therefrom, of means operating at right-angles to said clamping means to close said rudimentary ribs.

34. The combination, in a tag machine, with a channel for a tag-strip, means to clamp from above a blank in said channel, which blank has been cut from and replaced in said strip and has its tongue turned down, of means operating at right-angles to said clamping means to bend said tongue forward.

35. In a tag machine, vertically-reciprocating clamping mechanism for tag-blanks, horizontally-reciprocating rib-closing mechanism for ribs on one of such blanks, and horizontally-reciprocating tongue-deflecting mechanism for the tongue of another blank.

36. The combination, in a tag machine, with a blanking die, of a reciprocating holder, a punch in such holder, and a spring-pressed clamp provided with a stem carried by said holder at one side of said punch said clamp being adapted to retain the strip, from which the blank is cut, on said die while said blank is being punched out.

37. The combination, in a tag machine, with a grooved die, of a reciprocating holder, a rib-provided stamp in said holder, and a spring-pressed clamp carried by said holder and adapted to retain a tag-strip with a blank therein in place on said die while said stamp in connection with the die acts on the blank.

38. The combination, in a tag machine, with a grooved die, of a reciprocating holder, stamps, having ribs in line with the grooves in the die below, in said holder, and a spring-pressed clamp carried by said holder between said stamps and adapted to retain a tag-strip with a blank therein in place on said die while said stamps act in connection with the die to form ribs on the underside of said blank.

39. The combination, in a tag machine, of an anvil, a rib-closer, and means to actuate the latter toward and away from one end of said anvil, of a reciprocating holder, and a spring-pressed clamp carried by said holder and adapted to retain a tag-strip with a blank therein, such blank having a rudimentary rib, on said anvil while the rudimentary rib is being compressed between the anvil and rib-closer to form it into a finished rib.

40. The combination, in a tag machine, with an anvil adapted to support a tag-strip with a blank therein, which blank has two rudimentary ribs on the bottom thereof and is supported by said anvil between said rudimentary ribs, and reciprocable rib-closers adapted to compress said rudimentary ribs between the anvil and adjacent ends of said rib-closers, of a reciprocating holder, and a spring-pressed clamp carried by said holder and adapted to retain said strip and blank in place on said anvil while the rudimentary ribs are being compressed.

41. The combination, in a tag machine, with the bottom of a channel for a tag-strip, such bottom having a recess therein, of a reciprocating holder, a tongue-bending member in such holder in line with said recess, and a spring-pressed clamp carried by the holder and adapted to retain said strip with a blank therein in place on the bottom of said channel while said bending member turns down the tongue of the blank into the recess.

42. The combination, in a tag machine, with an anvil having an overhanging part, and a movable tongue-bender adapted to bend under said overhanging part the tongue of a tag blank on said anvil, of a reciprocating holder, and a spring-pressed clamp carried by said holder and adapted to retain said blank in place on the anvil during the tongue-bending operation.

43. The combination, in a tag machine, with the frame of the machine, and a channel for a tag-strip, the bottom of such channel forming a suitable printing bed, of a reciprocating plunger mounted in said frame, a holder attached to said plunger, a printing-wheel set supported from said holder, an ink-tank and ink-supply rollers suitably mounted on the back of said plunger, a pivotally-mounted arm connected at one end with the plunger and having an inking-disk and a ratchet-wheel revolubly mounted at the other end, a pawl pivotally attached to a fixed member and arranged to actuate said ratchet-wheel when the end of said arm which supports said ratchet-wheel and disk descends, a socket at the outer end of the plunger, a spring-pressed plunger-pin in said socket, said plunger-pin having an extension which is adapted to encounter said frame when the plunger rises, and a bell-crank-lever pivoted to the holder and carrying at one end an ink-transfer roller and having the other end connected with said plunger-pin, the arrangement of parts being such that when the plunger descends said printing-wheel set prints on the face-piece of a tag in the strip on said bed and at the same time the disk is elevated into contact with said ink-supply rollers and said ink-transfer roller is swung into contact with said disk, and when said plunger ascends said printing-wheel set is carried with it, the disk is lowered and partially rotated, and the extension on said plunger-pin strikes against the frame and causes said ink-transfer roller to be wiped across the characters at the bottom of the printing-wheel set.

44. In a tag machine, means to punch a finder hole in a tag-strip, means to punch a blank from such strip and replace it therein, means to bend down the tongue of a blank in the strip ahead of that last mentioned, and means to print on a tag previously formed from a blank and carried by the strip in advance of the blanks, all at a single operation.

45. A channel, in a tag machine, having its bottom consisting in part of a blanking die, a grooved rudimentary rib-forming die, an anvil, a grooved portion leading from said rib-forming die to said anvil, a recessed tongue-receiving part, and a grooved portion leading from said anvil to said tongue-receiving part.

46. A channel, in a tag machine, having its bottom consisting in part of a blanking die, a grooved rudimentary rib-forming die, an anvil, a grooved portion leading from said rib-forming die to said anvil, a recessed tongue-receiving part, a grooved portion leading from said anvil to said tongue-receiving part, and a grooved and slotted portion leading from said tongue-receiving part.

47. A channel, in a tag machine, having its bottom consisting in part of a blanking die, a grooved rudimentary rib-forming die, an anvil, a grooved portion leading from said rib-forming die to said anvil, a recessed tongue-receiving part, a grooved portion leading from said anvil to said tongue-receiving part, a second anvil, and a grooved and slotted portion leading from said tongue-receiving part to said second anvil.

48. In a tag machine, a channel for a tag-strip, feed-rollers adjacent to the delivery end of said channel, intermittently-operating actuating mechanism for said rollers, a suitably-supported stationary tag-receiving member leading from said delivery end of the channel out between said feed rollers, a suitably-mounted winding-roller for the waste portion of said strip, such winding-roller being located beyond said feed-rollers and above the plane of said tag-receiving member, a guide for such waste portion, such guide being conveniently situated relative to the upper of said feed-rollers, and means to drive said winding-roller concomitantly with the feed-rollers.

CHARLES F. SMITH.

Witnesses:
WILBUR M. STONE,
WILLIAM F. COLLINS.